United States Patent
McGill et al.

(10) Patent No.: US 6,678,685 B2
(45) Date of Patent: Jan. 13, 2004

(54) INTEGRATED HOUSEHOLD MANAGEMENT SYSTEM AND METHOD

(75) Inventors: Edmund McGill, Monroe, CT (US); John Hawkins, Fairfield, CT (US); Kurt Soderlund, New York, NY (US); Patrick O'Brien, Newton, CT (US)

(73) Assignee: Familytime.com, Inc., Westport, CT (US)

( * ) Notice: Subject to any disclaimer, the term of this patent is extended or adjusted under 35 U.S.C. 154(b) by 456 days.

(21) Appl. No.: 09/768,182

(22) Filed: Jan. 23, 2001

(65) Prior Publication Data

US 2002/0016734 A1 Feb. 7, 2002

Related U.S. Application Data

(60) Provisional application No. 60/178,171, filed on Jan. 26, 2000.

(51) Int. Cl.[7] .......................... G06F 17/30; G06F 17/60
(52) U.S. Cl. .................. 707/10; 707/102; 707/104; 705/14; 705/27
(58) Field of Search ................ 707/10, 102, 104; 705/14, 27; 725/23; 235/380

(56) References Cited

U.S. PATENT DOCUMENTS

| | | | | |
|---|---|---|---|---|
| 5,915,243 A | * | 6/1999 | Smolen | 705/14 |
| 5,974,399 A | * | 10/1999 | Giuliani et al. | 705/14 |
| 6,026,370 A | * | 2/2000 | Jermyn | 705/14 |
| 6,075,971 A | * | 6/2000 | Williams et al. | 725/23 |
| 6,230,143 B1 | * | 5/2001 | Simons et al. | 705/14 |
| 6,237,145 B1 | * | 5/2001 | Narasimhan et al. | 725/23 |
| 6,298,330 B1 | * | 10/2001 | Gardenswartz et al. | 705/14 |
| 6,321,208 B1 | * | 11/2001 | Barnett et al. | 705/14 |
| 6,477,509 B1 | * | 11/2002 | Hammons et al. | 705/27 |
| 6,484,146 B2 | * | 11/2002 | Day et al. | 705/14 |
| 6,505,773 B1 | * | 1/2003 | Palmer et al. | 235/380 |

* cited by examiner

Primary Examiner—Sanjiv Shah
(74) Attorney, Agent, or Firm—Kevin A. Oliver; Foley Hoag LLP

(57) ABSTRACT

The invention provides an Internet-based integrated household management system. Each user or household has a unique account with the provider of the system to manage their personal data within system. The provider uses this data to make available information that is relevant to the shopping and organizational tasks. This information may include promotional offers, product information and new product announcements for consumer products and services. The data structure can display information that is relevant to a user's specific needs, providing an efficient system of delivering highly targeted information to consumers. A directory format is included which enables users to search for specific types of information or browse available information that may have been filtered out based on the user's data. The user can be provided with purchase information and purchase incentives based on a user's profile and buying patterns.

8 Claims, 26 Drawing Sheets

INTEGRATED HOUSEHOLD MANAGEMENT SYSTEM AND METHOD

CROSS-REFERENCE TO OTHER PATENT APPLICATIONS

This application claims the benefit of the Provisional Application No. 60/178,171, filed Jan. 26, 2000.

FIELD OF THE INVENTION

This invention relates to methods and systems for managing family and household activities of subscribers, in particular for integrating such information with vendors and companies via the Internet.

BACKGROUND OF THE INVENTION

A number of applications for organizing data and schedules are known in the art. These applications can be either stand-alone or can operate among groups of users which may be linked, for example, via an Intranet. Also known in the art are Internet-based services that provide promotional and advertising material, such as special sales, special fares or merchandise coupons, to users who may have signed up for these services or may be targeted by advertisers and retailers based on demographic user profiles. Users may also select specific areas of interest, but these services may be limited to selected topics, such as travel, cars, etc. In daily family life, however, various tasks which may be interrelated have to be performed, some of them repeatedly and at regular time intervals. Family events, such as birthdays, anniversaries, have to be monitored; there may be an interest in consolidating financial statements and shop for the best available offers based on the family resources.

Accordingly, it would be desirable to provide to a subscriber an integrated household management system which administers household tasks.

SUMMARY OF THE INVENTION

The invention is directed to a method for managing household activities of a user connected to a service system, in particular via the Internet. According to the method, the user provides to the service system user data which include demographic user information and interactive user behavior characteristics, whereafter the service system—in response to the user data—provides the user with a household management tool. The user schedules the household activities by using the household management tool, wherein information about the scheduled household activities is transmitted from the user to the service system. The service system associates a scheduled household activity with an incentive and transmits the incentive to the user.

Embodiments of the invention may include one or more of the following features. The incentive may be provided to the service system by a provider, such as a retailer, a manufacturer, a service provider and/or a clearing house. The household management tool may include a scheduler and/or calendar and the scheduled household activity may be a meal schedule relating to recipes managed by the service system.

Other objects of the invention will, in part, be obvious, and, in part, be shown from the following description of the systems and methods shown herein.

BRIEF DESCRIPTION OF THE DRAWINGS

The foregoing and other objects and advantages of the invention will be appreciated more fully from the following further description thereof, with reference to the accompanying drawings wherein.

DESCRIPTION OF CERTAIN EMBODIMENTS

To provide an overall understanding of the invention, certain illustrative embodiments will now be described, including a system that manages family and household activities of subscribers. However, it will be understood by one of ordinary skill in the art that the systems and methods described herein can be adapted and modified for other suitable applications and that such other additions and modifications will not depart from the scope hereof.

Figure 1:
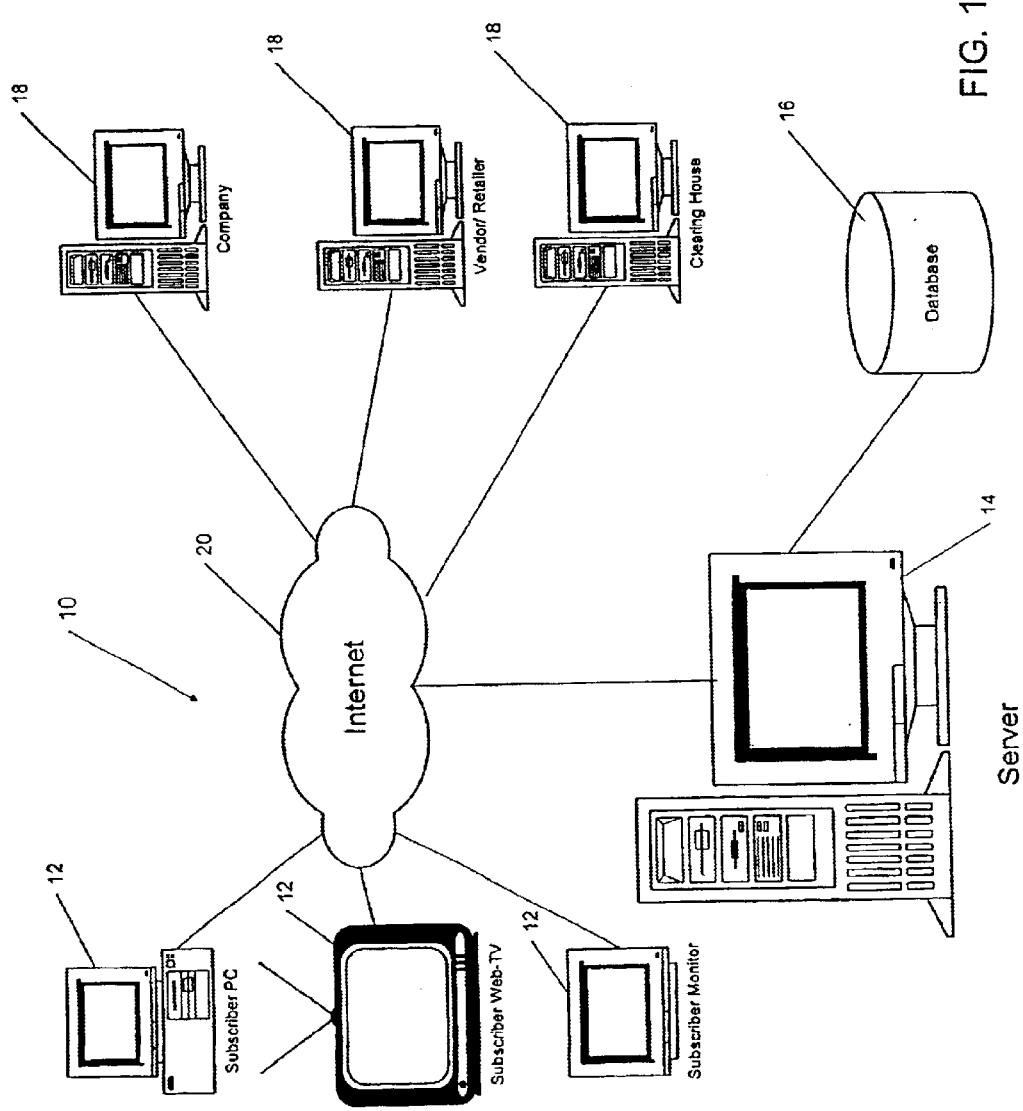
FIG. 1 depicts schematically the structure of a system according to the invention that employs a computer network for organizing family and household activities of users.

FIG. 1 depicts one embodiment of a system 10 according to the invention for managing family and household activities of a subscriber. Specifically, FIG. 1 illustrates a system 10 wherein a plurality of subscriber systems 12 connect through a network 20 to the server 14. The server 14 connects to a proprietary database 16 maintained by the server 14 and similarly connects, optionally by direct secure lines, to a plurality of service providers or merchandise vendors 18. The elements of the system 10 can include commercially available systems that have been arranged and modified to act as a system according to the invention, which allows a subscriber to carry out integrated household activities, and optionally generate records of these integrated activities. The system 10 of FIG. 1 employs the Internet to allow a subscriber at a remote client, the subscriber systems 12, to access a central server, the depicted central server 14, to login to an account maintained by that server, and to employ the services provided to that account to manage family and household activities of the subscriber.

Figure 2:
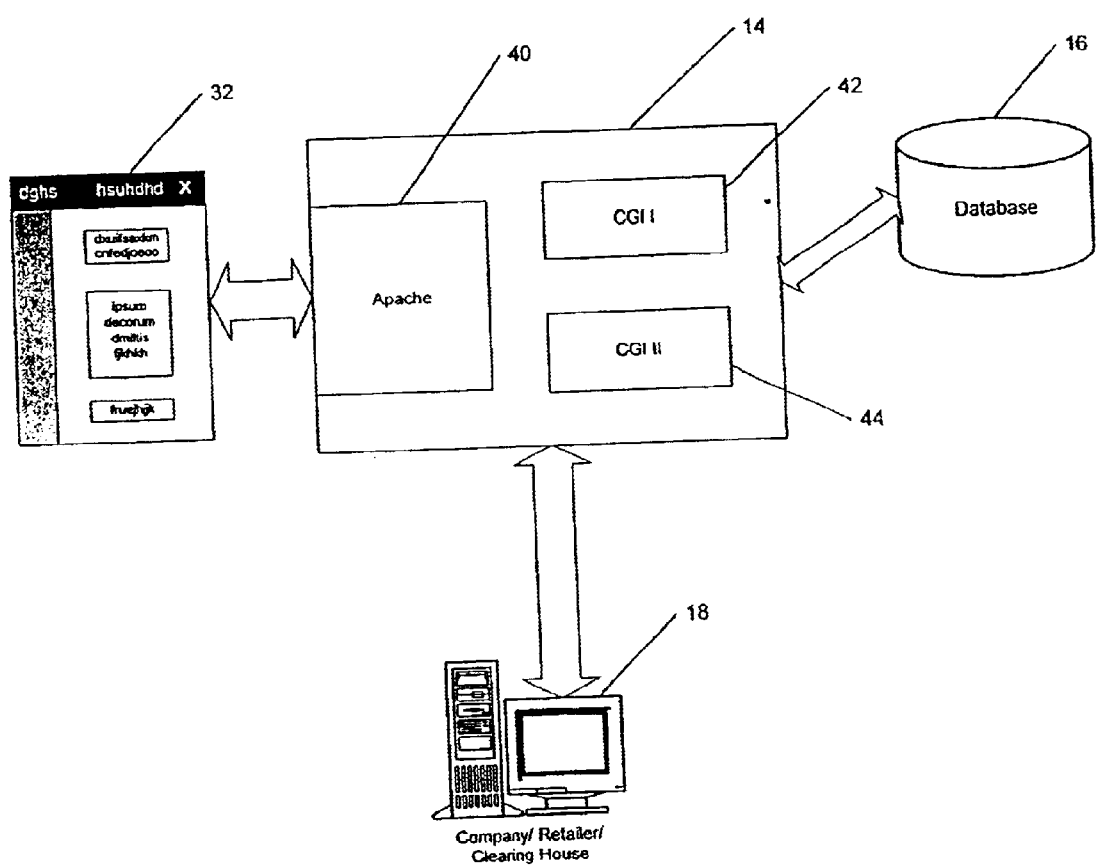
FIG. 2 depicts in more detail the structure of a system for managing family and household activities of users.

For example, as shown in FIG. 2, the server 14 can present the subscriber with an HTML page 32 that acts as a user interface. This user interface can present to the subscriber a set of controls for managing family and household activities of the subscriber. For example, the user interface can provide to the subscriber a control, typically a button on a web page, that directs the system to promotional offers from selected companies, retailers, clearing houses, and so on. Error! No table of contents entries found. Turning now the elements that compose the system 10 depicted in FIG. 1, it can be seen the system 10 includes a network based system that includes a plurality of client systems 12 that connect through a network 20, such as the Internet IP network, or any suitable network to a server system, such as the server system 14 depicted in FIG. 1. The server 14 can connect over dedicated channels, over the Internet, or by other means, such as dedicated and/or secure lines, to the vendor systems 18.

For the depicted system 10, the client systems 12 can be any suitable computer system such as a PC workstation, a Web-TV, a monitor or display installed, for example, in a kitchen area of the subscriber, a wireless communication device, or any other such device, equipped with a network client capable of accessing a network server and interacting with the server to exchange information with the server. In one embodiment, the network client is a web client, such as a web browser that can include the Netscape web browser, the Microsoft Internet Explorer web browser, the Lynx web browser, or a proprietary web browser, or web client that allows the user to exchange data with a web server, and ftp server, a gopher server, or some other type of network server. As mentioned above, the client 12 and the server 14 rely on an unsecured communication path, such as the Internet, for accessing services on the remote server 18. To add security to such a communication path, the client and the server can employ a security system, such as any of the conventional security systems that have been developed to provide to the remote user a secured channel for transmitting data over the Internet. One such system is the Netscape secured socket layer (SSL) security mechanism that provides to a remote user a trusted path between a conventional web browser program and a web server. Therefore, the client systems 12, the vendor systems 18 and the server system 14 may have built in 128 bit or 40 bit SSL capability for establishing an SSL communication channel between the clients 12 and the server 14. Other security systems can be employed, such as those described in Bruce Schneir, *Applied Cryptography* (Addison-Wesley 1996). Alternatively, the systems may employ, at least in part, secure communication paths for transferring information between the server and the client. For purpose of illustration however, the systems described herein, including the system 10 depicted in FIG. 1 will be understood to employ a public channel, such as an Internet connection through an ISP or any suitable connection, to connect the subscriber systems 12 and the server 14.

The server 14 may be supported by a commercially available server platform such as a Sun Sparc™ system running a version of the Unix operating system and running a server capable of connecting with, or exchanging data with, one of the subscriber systems 12. In the embodiment of FIG. 1, the server 14 includes a web server, such as the Apache web server or any suitable web server. The web server component of the server 14 acts to listen for requests from subscriber systems 12, and to in response to such a request, resolves the request to identify a filename, script, dynamically generated data that can be associated with that request and to return the identified data to the requesting subscriber system 12. The operation of the web server component of server 14 can be understood more fully from Laurie et al., Apache: The Definitive Guide, O'Reilly Press (1997). The server 14 may also include components that extend its operation to accomplish the integrated household activities described herein, and the architecture of the server 14 may vary according to the application. For example, the web server may have built in extensions, typically referred to as modules, to allow the server 14 to perform operations that facilitate the integrated household activities desired by a subscriber, or the web server may have access to a directory of executable files, each of which files may be employed for performing the operations, or parts of the operations, that implement the integrated household activities of the subscriber. Thus it will be understood that the server 14 may act as a household activities transaction server according to the invention that configures the work station hardware supporting the server 14 to act as a system according to the invention.

The server 14 may couple to a database 16 that stores information representative of a subscriber's account, including information regarding the subscribers accounts, including passwords, user accounts, user privileges and similar information. The depicted database 16 may comprise any suitable database system, including the commercially available Microsoft® Access™ database, and can be a local or distributed database system. The design and development of database systems suitable for use with the system 10, follow from principles known in the art, including those described in McGovern et al., *A Guide To Sybase and SQL Server,* Addison-Wesley (1993). The database 16 can be supported by any suitable persistent data memory, such as a hard disk drive, RAID system, tape drive system, floppy diskette, or any other suitable system. The system 10 depicted in FIG. 1 includes a database device 16 that is separate from the server station platform 14, however, it will be understood by those of ordinary skill in the art that in other embodiments the database device 16 can be integrated into the server 14.

FIG. 2 provides a functional block diagram of one server 14 for managing family and household activities of the subscriber and further depicts the data flow diagram of one example of a subscriber s use of the server 14 to perform an integrated financial transaction between the financial service providers 28 and 30. Specifically, FIG. 2 depicts a data flow diagram wherein a subscriber 12 employs a user interface 32, such as an HTML page, to provide user input to the server 14. As can be seen from FIG. 2, the server 14 manages the subscriber's account and also manages communication between the subscriber and the various companies/retailers/clearing houses in which the subscriber either has a direct interest (response by clicking through) and/or which the server administrator deems to be of interest to the subscriber based on a profile of the subscriber's integrated household activities, which can include, for example, demographic user information and interactive user behavior characteristics. Specifically, the server 14 is described as a functional block diagram that includes, among others, a web server 40 and a common gateway interface (cgi) module 42, 44 which can communicate web page content to and from a database 16 or a database of retailer 18. The web server 40 can be any suitable web server, for example, an Apache™ web server having access to a set of executable files stored in a directory accessible to the web server 14, such as the cgi-bin directory in module 42.

One such executable file may be a script that implements a procedure for displaying a shopping list or a script creating a recipe database, such as the depicted Active Server Pages (ASP) or the Database Tables described below. The database manager 44 may be a Perl V script, a C language program or any other suitable program for providing a process that can manage, in response to information provided by the subscriber, database entries of the subscriber.

The client PC's 12 depicted in FIG. 1 can be conventional personal computers having a CRT monitor, but may also be Web-TV's or intelligent LCD displays that can be incorporated, for example, in appliances, such as a refrigerator. The client PC's 12 may be provided with standard input/output devices (not shown), such as keyboards, mice, scanners or barcode readers, and printers. It can therefore be understood as a system that can provide a hard copy of the data results and promotional material, such as vendor coupons.

The depicted database 16 can be any suitable database system, including the commercially available Microsoft® Access™ database, and can be a local or distributed database system. The design and development of suitable database systems are described in McGovern et al., *A Guide To Sybase and SQL Server,* Addison-Wesley (1993). The database 16 can be supported by any suitable persistent data memory, such as a hard disk drive, RAID system, tape drive system, floppy diskette, or any other suitable system. The system depicted in FIG. 1 includes a database device 16 that is separate from the server platform 14, however, it will be understood by those of ordinary skill in the art that in other embodiments the database device 16 can be integrated into the system 14.

The application for organizing integrated household activities (hereinafter also referred to as the "Application") will now be described in detail. Each user has a unique account for managing the personal data within the Application. The Application uses this data to make available information that is relevant to the shopping and organizational tasks completed with the Application. This information may include promotional offers, product information and new product announcements for consumer products and services. The Application's data structure makes it possible to display information that is relevant to the user's specific needs, thus providing an efficient system of delivering highly targeted information to consumers. A directory format may be included to enable users to search for specific types of information or browse available information that may have been filtered out based on the user's data.

The information resides on the server in electronic form. It is posted and managed by the Application. Additional tools enable third parties to post and administer the information specific to their consumer products and services.

A user will have some combination of the following options to use the available information:

Participate in a sweepstakes, refund offer, or contest (in electronic or physical form).

Request a sample of a product or service (mailed in physical or electronic form).

Purchase a product or service online (typically with a discount of some kind delivered electronically).

Add a notification or reminder to the Application's calendar for some future action.

Add an item to the Application's To-Do List for some future action.

Add an item to the Application's Shopping List (printed by the user from their desktop printer).

Print a discount provided at retail (e.g. coupon) from their desktop computer (the coupon may require printing on secure, coded paper issued by the Application).

Receive an electronic credit for the future purchase of a product or service (the credit may, for example, be stored on a user's smart card).

The Application automates many of the actions required to complete the above actions. For example, integration with the user's account makes it possible to attach information to calendar events (e.g. oil change for car); address information is used to complete fulfillment forms; and discounts are automatically applied to a user's smart card when requested. User participation in these actions will be recorded within the Application's database, making it possible to deliver more relevant, targeted information over time. This data also provides a significant resource for market research.

In other words, the application allows people to quickly build lists that can be used to compare to activities, purchases, advertising, offers, all things that are involved and planning their day to day living activities. This feature becomes powerful when used in conjunction with the Internet because it can actually be found out what people are adding to recipes and to the product list. The application build an information database as the number of people increases. This becomes the heart of the integrated household management system which is easy to use and can provide useful data that can be valuable to manufacturers and advertisers because of the large database encompassing many products and ingredients.

Figure 3:
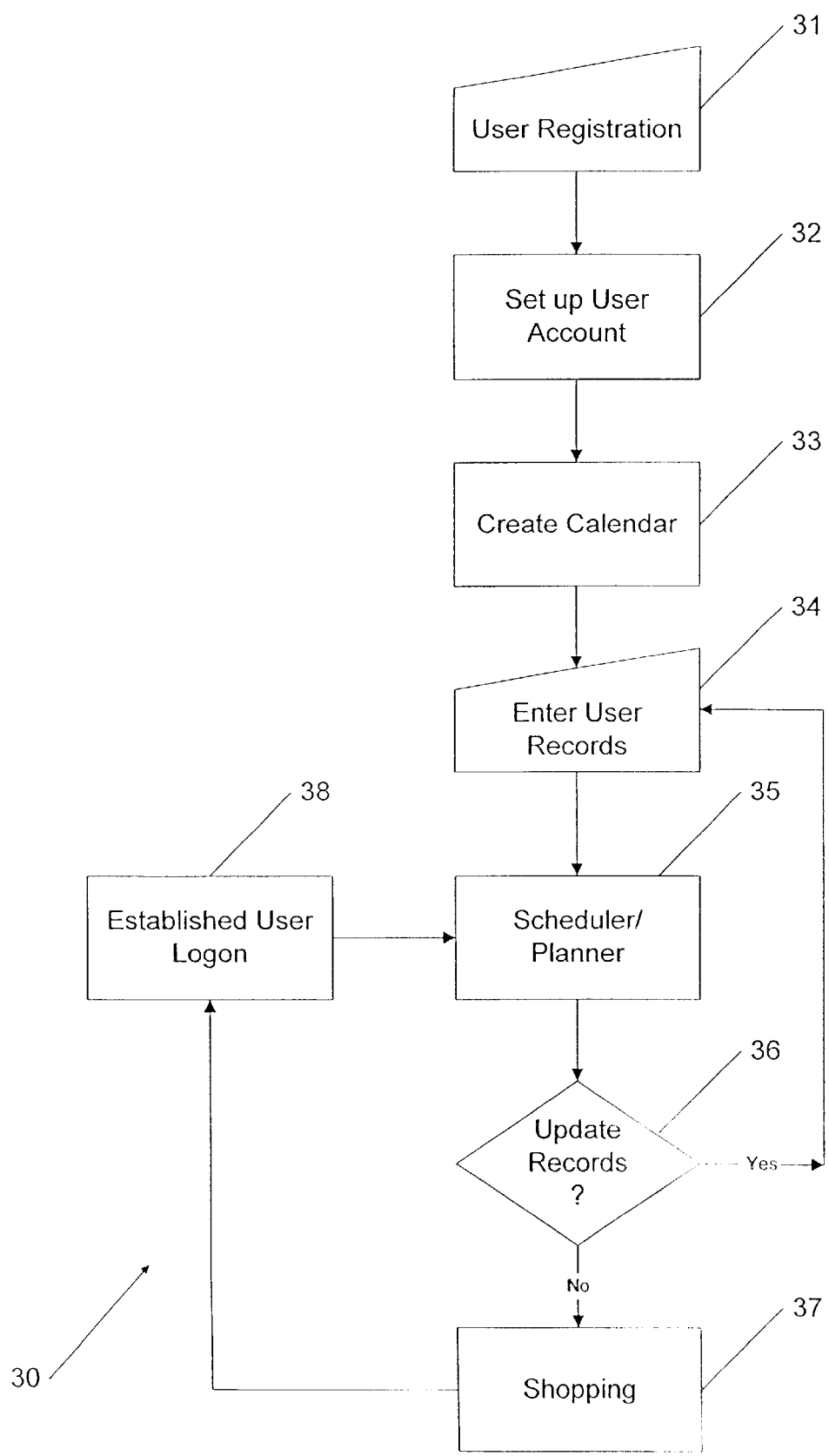
FIGS. 3 and 4 are flow diagrams for organizing the family and household activities of users according to the invention.

Referring now to FIG. 3, a process 30 for integrating the family and household activities begins with the registration of a potential user/subscriber, step 31. The Application should be provided with the following information: First name, last name, login username/password for entry into system, and email address. In addition, a user can enter other information, such as address, phone number, etc.

A user account is set up, step 32, wherein a family may share a single "User" account. Each family member would be set up under that user account, but may have a different screen name, and would be able to enter his/her own information and events, with individual calendars provided for each family member, step 33. These calendars could also be displayed in a composite family calendar, checking for and eliminating potential conflicts. Unique icons and colors may indicate the individual owner of events on the family calendar, and an icon/color legend may be displayed at the bottom of calendars and/or printouts.

The calendar(s) may be stored in the server database 16 so that dated material, such as announcements, promotional material and reminders, can be centrally managed and sent to the user in a timely fashion. In one practice, the calendar will display events in daily, weekly, monthly, or yearly format.

Events may have the following attributes:

Event Name—Thumbnail description of event

Type—Call, Medical, Note, Personal, Work, Other

Dale—Date of event (if not recurring)

Start Time—Start time of event (if not an all-day event)

End Time—End time of event (if not an all-day event)

Description—Description of the event

Email Notification—Days/hours/minutes before an event to send an email reminder of event Email List—List to receive notification Family Member—All family members participating in the event If an event is recurring, some additional information will be required. Recurring events can have a period defined by an end date, and can be defined as follows:

| | |
|---|---|
| Daily | An event that occurs every day during a period (e.g. water neighbor's plants daily while away on vacation) |
| Weekly | An event that has the same weekly pattern during a period, user can select day(s) of event (e.g. soccer practice) |
| Monthly | An event that has the same monthly pattern during a period, user can select absolute day or nth of a day of the week in the month (e.g., playgroup the first Wednesday of each month) |
| Yearly | An event with the same yearly pattern, user can select absolute day or nth day of the week of a month (e.g., anniversaries, birthdays, etc.) |

Recurring events may also have masked-out periods, which may represent vacations or other periods which interrupt a normal routine. Users also can reschedule an event that is part of a string of recurring events without effecting the other events that are part of that string of recurring events. A printable view may be available for daily, weekly and monthly calendars. Only the start time of an event may be displayed on the calendar. A daily view may show end times (if applicable). A list of suggested events, to be supplied by the provider, may be made available to help in planning family activities. Events may also be sponsored by companies and may therefore include links to additional, related information (e.g. planning for the event, to-do list for the event, sponsor information and promotional offers). The calendar may be integrated with other portions of the Application. For example, family member birthdays and anniversaries, to-do list items, warrantee expiration, and next service dates, for example for cars, can all be displayed.

Events of a given type or pertaining to a specific family member can be criteria for filtering events. Holidays may also be displayed on the calendar, using a user-configurable setting. A user can elect to show holidays, no holidays, or combinations of holiday groupings, such as US holidays, Canadian holidays, Jewish holidays or Christian holidays. Event calendars provided by the user (auto maintenance, pregnancy, spring cleaning, lawn care, etc.) may be merged with calendar entries supplied by the household management system or other sponsors. (e.g. puppy care kit from X company offered within events from the Puppy Calendar).

The user is then encouraged to enter user records, step 34. User records may include:
- Gift recipients, including sizes, likes/dislikes, and gift ideas
- Home maintenance/services, such as babysitters, pest control, lawn care, appliance repair, etc.
- Pet information
- Family members, including birthdays and anniversaries
- Financial information (bank accounts, safety deposit boxes, insurance policies, etc.)
- Home inventory
- Medical information
- Contact information (address book, important dates, children names and birthdays, etc.) of friends, service companies, and the like may also be supplied and stored in the database 16 of the household management system. This contact information will be integrated with other section of the Application, making it easy for users to add to the contact information from a Home Maintenance section (e.g. add appliance retailer and/or service provider). Similarly, important dates (e.g. birthdays, anniversaries) added to a Contact Record can be automatically added to the calendar.

A large portion of family income is typically spent on food and services. Careful planning and taking advantage of coupon savings and other promotions may significantly reduce the expenses for such items. Accordingly, the user will be able to schedule a meal and/or other functions, step 35, as follows:
- Storing meals in daily breakfast, lunch, dinner, or snack bins
- Assembling recipes into meals
- Building, saving and editing meals and assigning them to a schedule (e.g. Favorites)
- Assigning generic and branded items to meals
- Building, saving and editing a personalized list of frequently used items The meals may preferably be integrated with a shopping list. Meals can be built and edited on a per day basis. The HTML page 32 may include multiple frames to facilitate adding to a meal. Ingredients, recipes, saved meals, generic items and branded products can all be added to a meal. Users may have the option of viewing the meal schedule on a weakly or monthly basis. Basic meals for each user can be created, such as orange juice, toast, and cereal for breakfast, ham and cheese sandwich and an apple for lunch, etc., as a starting point for creating daily meal plans. Additional stock meals may be suggested by the household management system. Stock meal categories may be arranged by region, "quick" "family style", etc. A printable view may be available. Users may have the option of previewing the applicable recipes and selecting for printing.

Scheduling and planning, step 35, also gives the user the opportunity to view stock recipes managed by the household management system and his own recipes. The user, however, will only be able to edit or delete his own recipes. A memo field may be provided for users to write and save notes related to other recipes. Recipes may be searched based on food group, region, nutrients, course, cookbook, preparation time, or keyword and may be assigned to a meal.

When entering a recipe, a user will be prompted to enter name, and instructions. He will also be able to enter cookbook, and chapter, serving size, search criteria, notes, and tips. A user may be able to optionally select from a predetermined number (for example, 4) of stock images pre-selected by the household management system and assign these stock images to his recipe. An option to "email the recipe to a friend" may be included on the recipe detail page.

Figure 4:
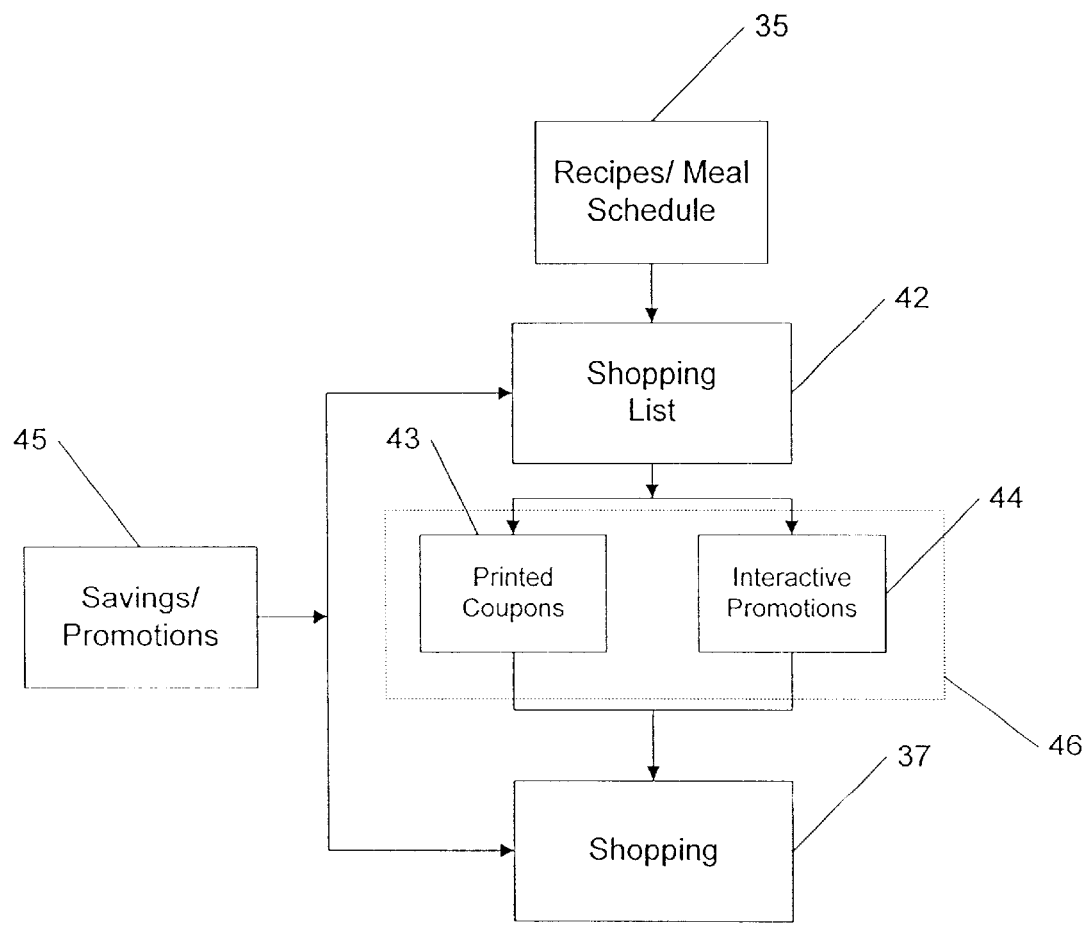

Another function provided by the Scheduler/Planner 35 is the creation of a shopping list. Referring now also to FIG. 4, the Application creates a shopping list, step 42, based on the meals created with the meal schedule and recipes described above with reference to step 35. The user may add items to the shopping list from a "Quick List", available meal plans, other suggested meals, recipes, product lists, generic lists, or by searching, for example, the Internet, and/or by free-typing. The user may also integrate planned meal schedules and/or promotional offers/coupons, possibly based on product category.

A user will only be able to manage his own shopping lists. His Quick List will start with items seeded by the household management system. This list can then be edited by users. There will be several ways for a user to add items to the Quick List, including from the Shopping List, recipes, product list, generic list, savings organizer and free-typing. All items added to the Quick List should include its designation in the product hierarchy (department, category and class).

Duplication of items on a shopping list should be avoided. To see where items came from, such as salt coming from several recipes, a recipe option will be available, A shopping list will not list quantities by default. Notes field may be provided for each item which can include quantities (or another suitable descriptor) if entered by the user. Quantities required for recipes are displayed within the recipe option. Users can type the required quantities in the notes field if desired.

Advantageously, the user will be able to view for each item all competitive products by product class. The user will be able to enter free-form items as well as selecting from available choices. Users will be prompted to indicate the hierarchy of the item (department, category and class), and have the option of adding the item (with designated hierarchy) to the Quick List. A printable view will be available. Users will have the option to preview all applicable recipes and savings offers and select them to be printed.

The user may decide to plan a meal or any other purchase based on savings available from different companies or vendors. The shopping list is therefore advantageously integrated with the saving offers as follows: a button may be placed at the top of the list to display all offers relating to items on the list (including competing items, in the case of brands). An icon may indicate the availability of an offer for each item in a product class with an available offer. Clicking this icon will display any offers relating to the product.

Offers may be placed in a savings organizer 46 which summarizes all offers. Promotional offers may be distributed in different form, for example, in the form of printed coupons 43, which can be redeemed at a store or, if ordering over the phone or the Internet, by mentioning a characteristic identification number on the coupon. Alternatively, promotions 44 may be interactive, i.e., electronically linked with, for example, store registers so that a user will receive the discount at the checkout stand based on, for example, his/her store ID card, credit card and the like. Many of these offers also will appear in additional areas of the Application when appropriate (e.g. shopping list when related item is on list; calendar when related to event; to-do list when related to activity). Because the data are stored in centralized manner in the household management system's database 16, a user will always be viewing the most current coupon/offer data. The coupon/offer data will be maintained by the household management system, either directly or by its partners.

Users may be able to search by offer types (e.g. coupons, contests, Internet alerts, newspaper alerts, in-store promotions, giveaways, etc.), by product category, brand, or keyword. Users can mark and be alerted to offers on the calendar (Video rental offers, Jiffy Lube offers for oil changes, etc.). In other words, the savings/promotions may be linked to both the shopping list 42 and the actual shopping places 37.

Referring back to FIG. 3, the user may update his/her personal records, as described in the specification, step 36, in which case the Application 30 return to step 34. Updating may be performed anytime during the session with the household management system and/or off-line. A registered user can log on directly, preferably after entering a password, step 38, and view, for example, the scheduling/planning HTML page, step 35.

The user may not only rely on a computer or Web-TV as interactive devices for communicating with the household management system. For example, passive displays or displays having limited interactivity (such as displays combined with a keypad or with voice-activated controls) may be located in areas, such as the garage of the household, the kitchen and/or the laundry room to display messages alerting the user to promotional offers or scheduled service, for example, for the car or an appliance. Such devices may also be connected to wireless communication devices to provide increased flexibility in scheduling.

The Application may also support to-do lists which include to-do items of various types, such as "spring cleaning to be provided by CompanyX." To-do list items can have dates associated with them, and can be displayed on the calendar.

Content may be posted on the household management system's web site and may include the following types:

1. Ideas and information that support or enhance the user's experience with the functionality identified above. Examples include:
   Descriptions of family activities with events that can be added to the calendar
   Meal planning suggestions with related meal plans that can be added to the Meal Planner
   Project tips and information with To-Do lists that can be added to the To-Do List and calendar
2. Tips, information and polls that encourage interactions among users to build community (see below), such as free email, chat rooms, bulletin boards and home pages.

Figure 5:
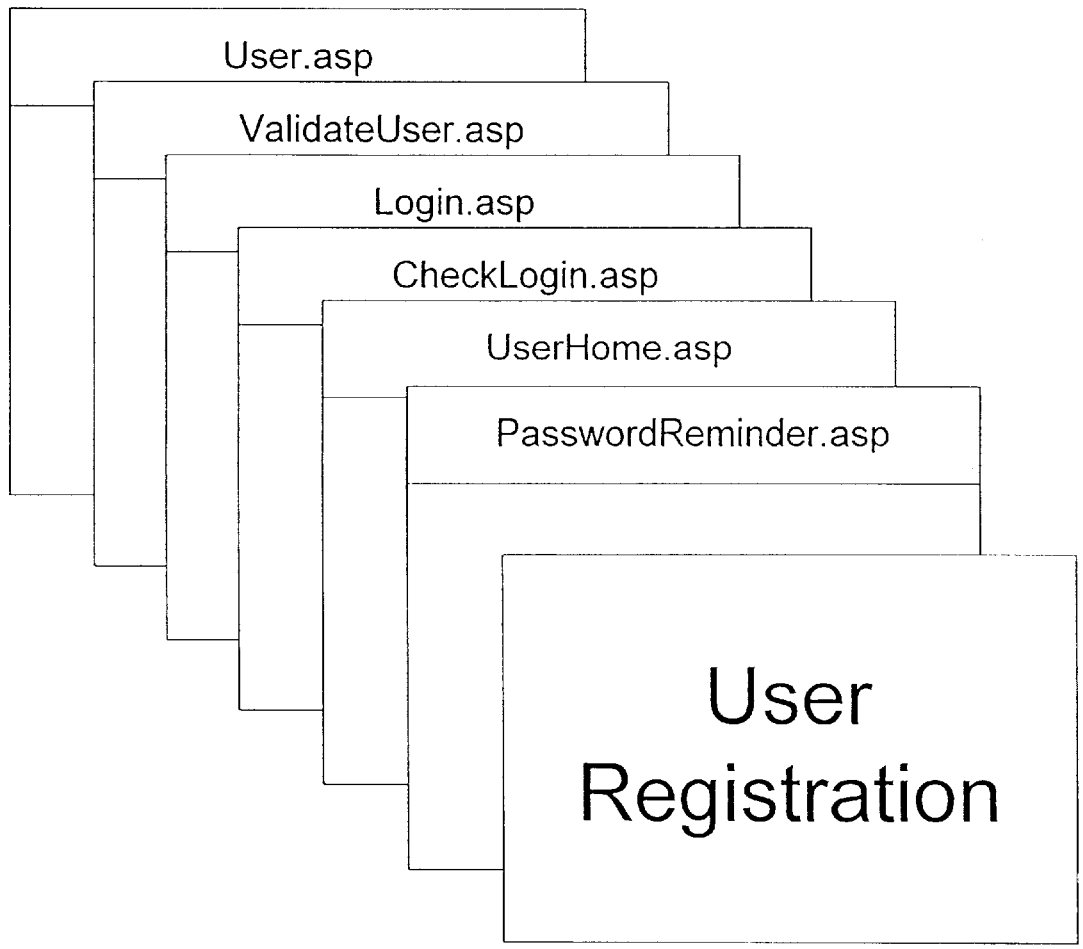
FIGS. 5–11 shows the organization of active server screens for the user.

Referring now to FIGS. 3 to 11 and also back to FIG. 2, the Application environment may include dynamic web pages created using ASP, with a combination of VisualBasic (VB) script, JAVA. and C++ being used where appropriate to handle advanced functionality. The dynamic pages interfacing with the database can use Active Server Pages (ASP). The following is a partial list of ASP's:

For User Registration (see FIG. 5)

Figure 6:
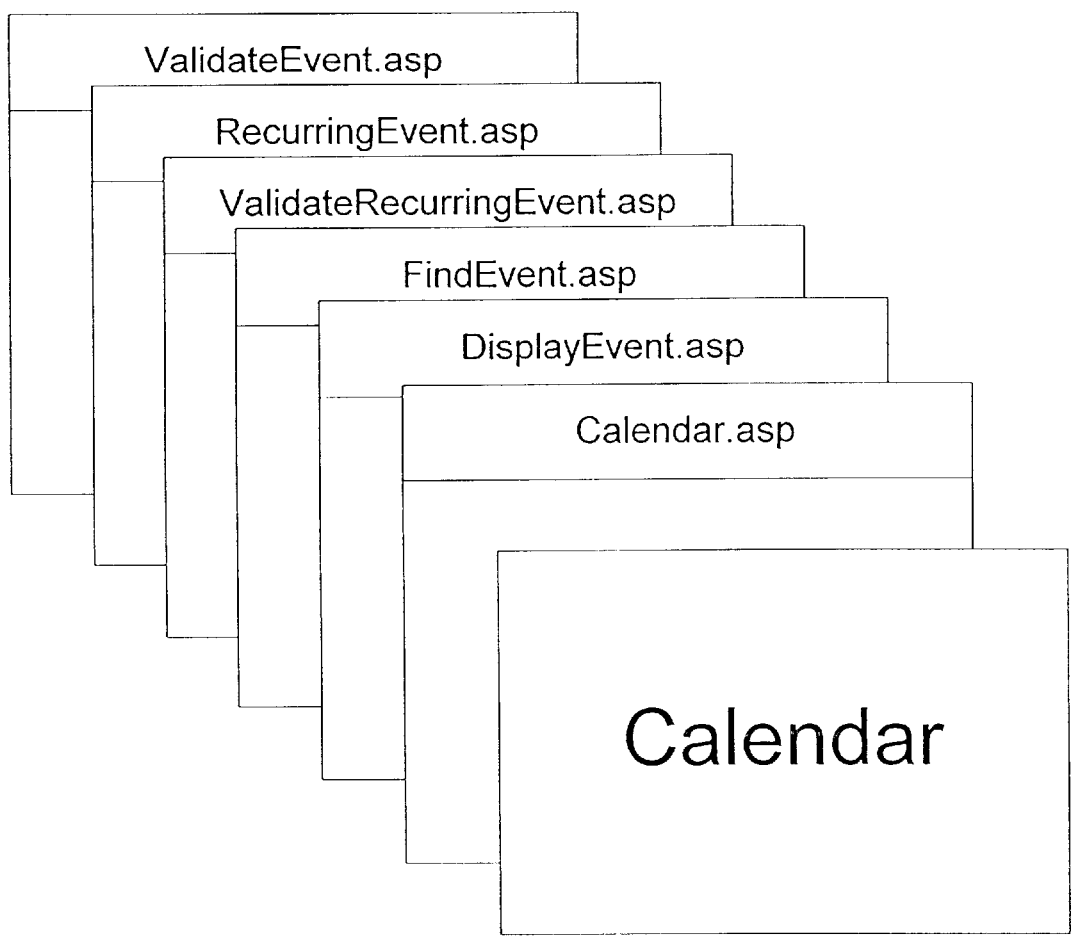

User.asp—Allows a user to enter or modify his information uses sp_ReadUser for update ValidateUser.asp—Confirms information, performs appropriate database operation, using sp_InsertUser or Sp_UpdateUser Login.asp—Allows a user to enter username/password information CheckLogin.asp—Validates login using sp_login UserHome.asp—Welcomes user who has successfully logged in, allows access to member functions PasswordReminder.asp—Emails user with password based on login name or email address Calendar (see FIG. 6)

Figure 7:
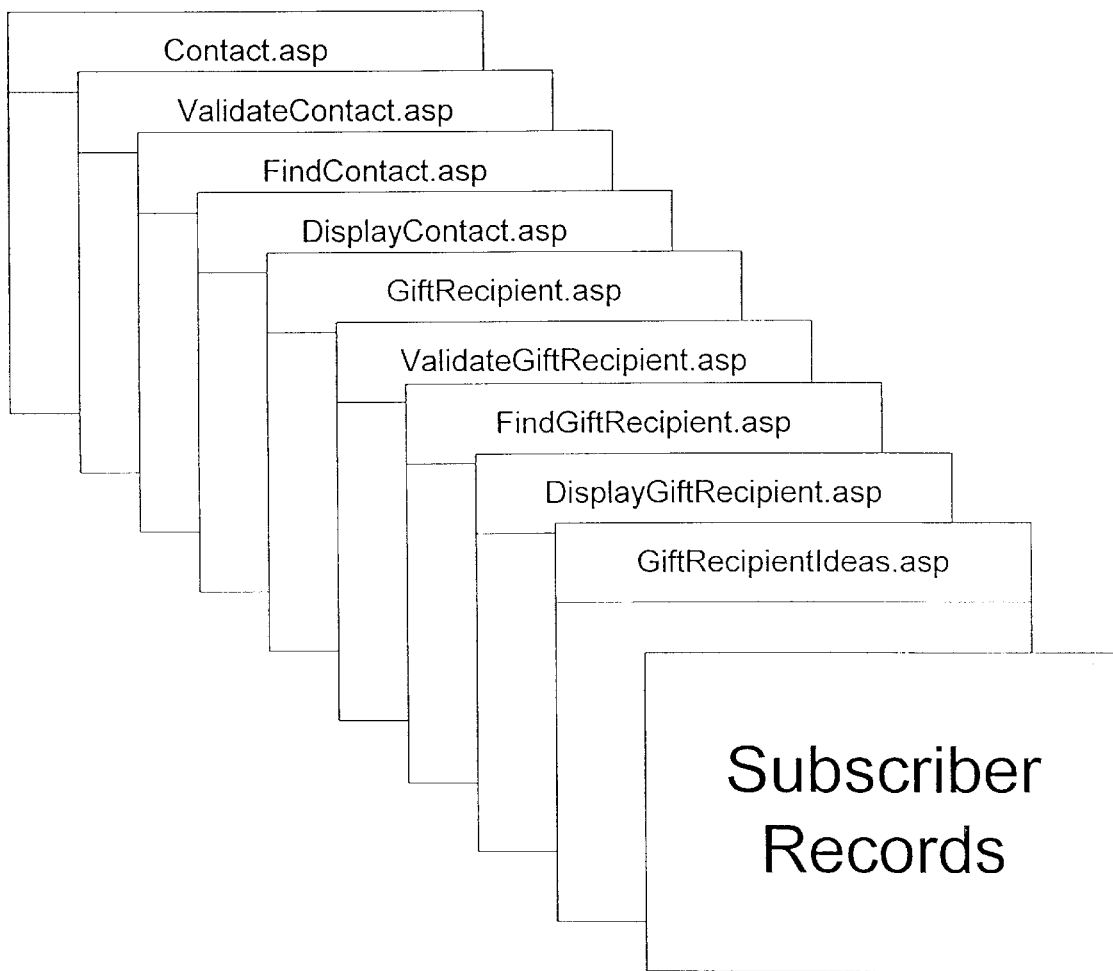

Event.asp—Allows a user to enter or modify an event, uses sp_ReadEvent For update ValidateEvent.asp—Confirms information, performs appropriate database operation, using sp_InsertEvent or sp_UpdateEvent RecurringEvent.asp—Allows a user to enter or modify an event, uses sp_ReadRecurringEvent for update ValidateRecurringEvent.asp—Confirms information, performs appropriate database operation, using sp_Insertrecurringevent or sp_UpdateRecurringEvent FindEvent.asp—Allows a user to search for an event DisplayEvent.asp—Displays events which meet search criteria in text format, displayed page by page Calendar.asp—Calls COM object, sets up links, formats data Subscriber Records (see FIG. 7)

Figure 8:
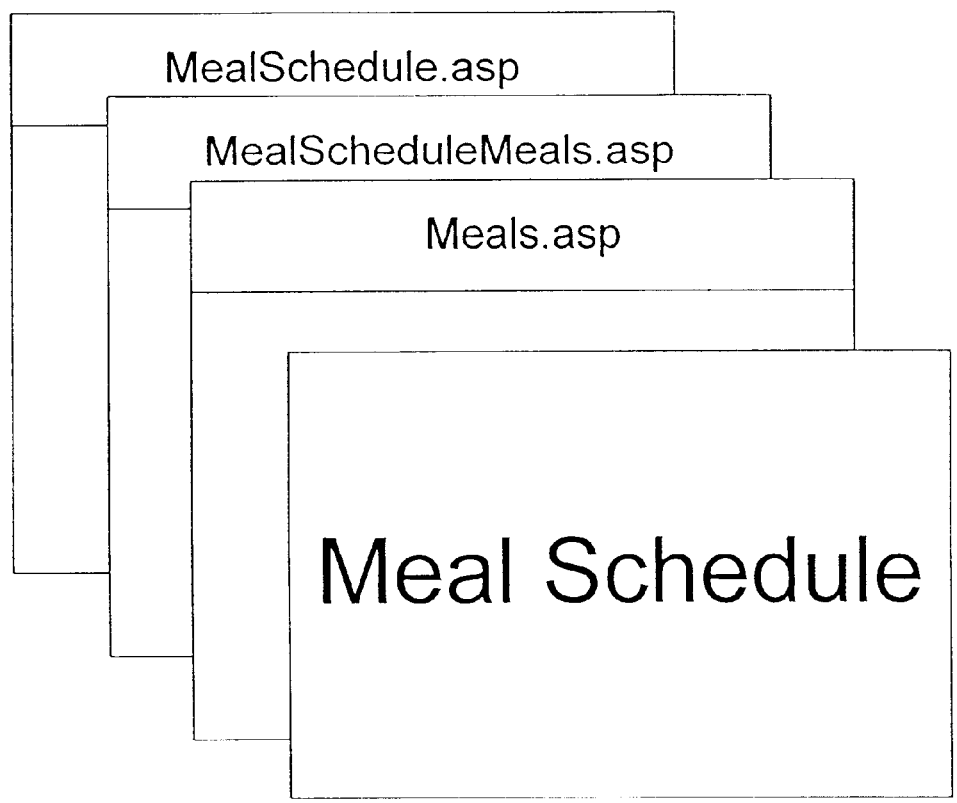

Contact.asp—Allows a user to enter or modify contact information, uses sp_ReadContact for update ValidateContact.asp—Confirms information, performs appropriate database operation, using sp_InsertContact or sp_UpdateContact FindContact.asp—Allows a user to search for a contact DisplayContact.asp—Displays contacts which meet search criteria in text format, displayed page by page GiftRecipient.asp—Allows a user to enter or modify gift recipient information, uses sp_ReadGiftRecipient for update ValidaleGiftRecipient.asp—Confirms information, performs appropriate database operation, using sp_InsertGiftRecipient or sp_UpdateGiftRecipient FindGiftRecipient.asp—Allows a user to search for a gift recipient DisplayGiftRecipient.asp—Displays gift recipients which meet search criteria in text format, displayed page by page GiftRecipientIdeas.asp—Allows a user to enter or modify gift ideas Meal Schedule (see FIG. 8)

MealSchedule.asp—Displays monthly meal schedule

MealScheduleMeals.asp—Allows a user to add or remove a meal from the schedule

Meals.asp—Allow a user to create a meal and assign recipes to it

Figure 9:
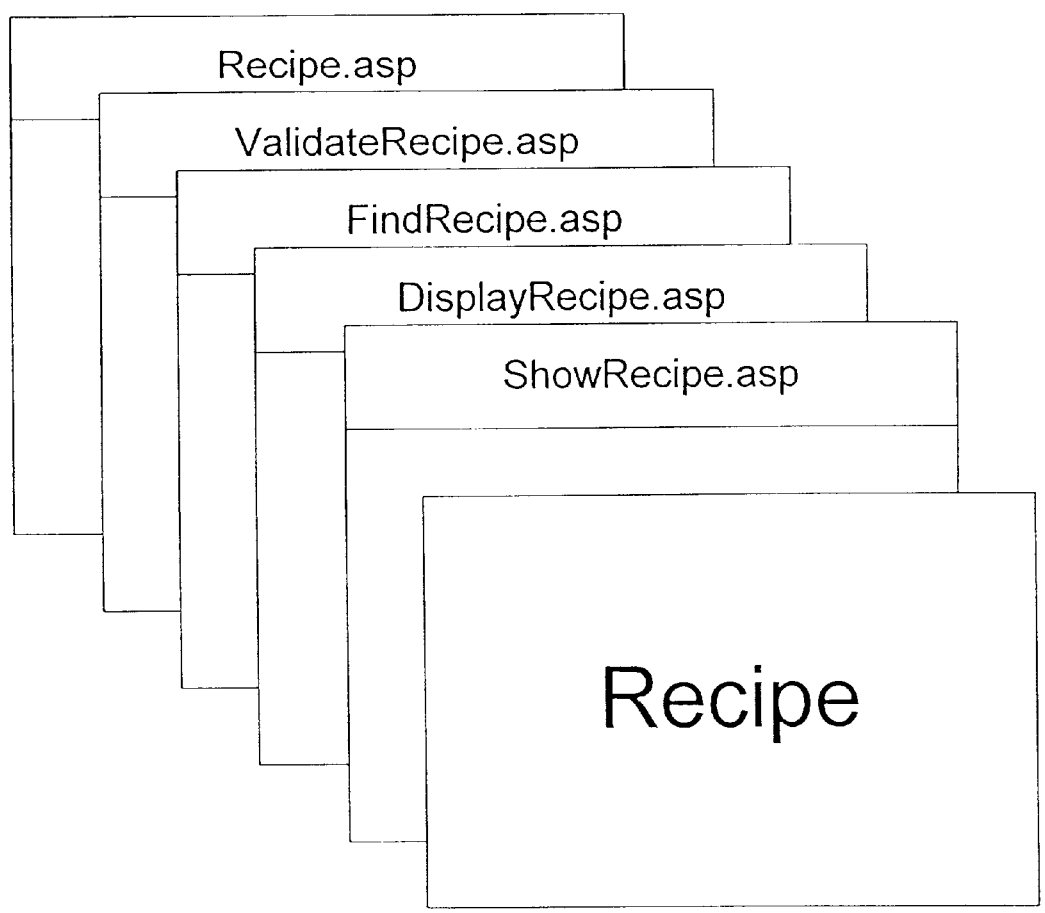

Recipe (see FIG. 9)

Recipe.asp—Allow a user to enter or modify his information, uses sp_ReadRecipe for update ValidateRecipe.asp—Confirms information, performs appropriate database operation, using sp_InsertRecipe or sp_UpdateRecipe FindRecipe.asp—Allows a user to search for a recipe DisplayRecipe.asp—Displays recipes which meet search criteria in text format with thumbnail, displayed page by page Show Recipe.asp—Displays individual recipe in graphical format

Figure 10:

Shopping (see FIG. 10)

ShoppingList.asp—Allows a user to enter or modify his information, uses sp_ReadShoppingList for update ValidateShoppingList.asp—Confirms information, performs appropriate database operation, using sp_InsertShoppingList or sp_UpdateShoppingList ShoppingListItem.asp—Allows a user to select an item which is added, modified or removed from the list

Figure 11:
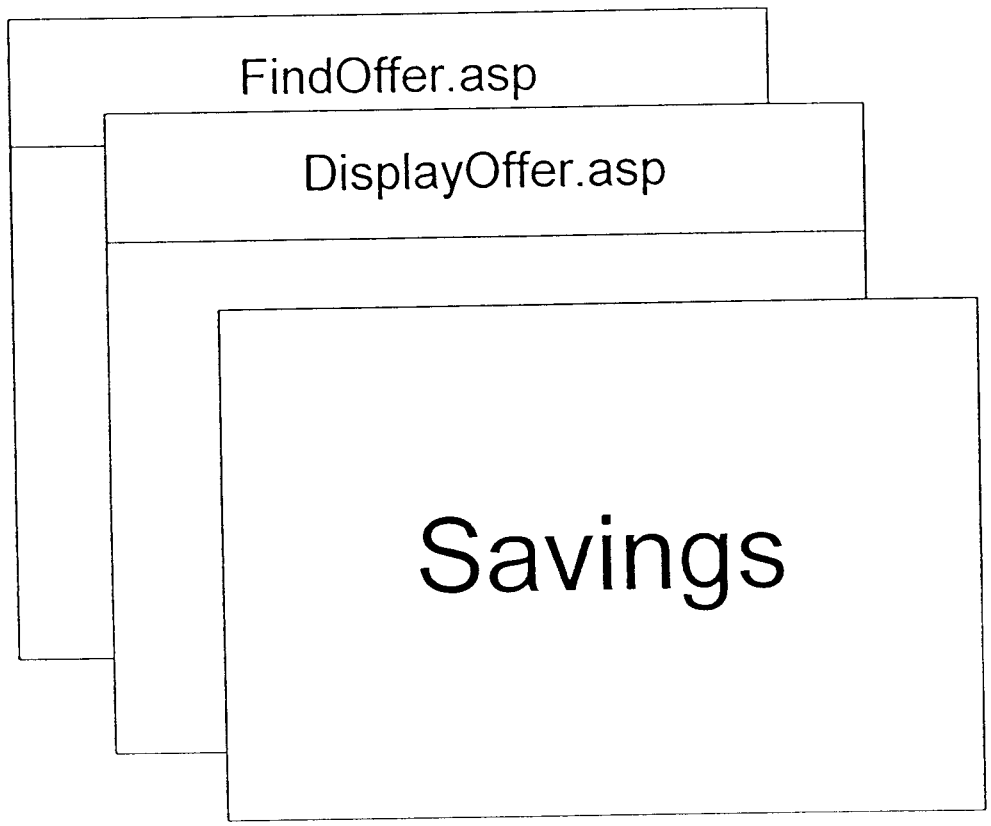

Savings (see FIG. 11)

FindOffer.asp—Allows a user to search for an offer

DisplayOffer.asp—Displays offers which meet search criteria in text format, displayed page by page.

Printing may be implemented through the web browser. Shopping lists, meal plans, calendar views, and coupons can have printable views.

Figure 12:
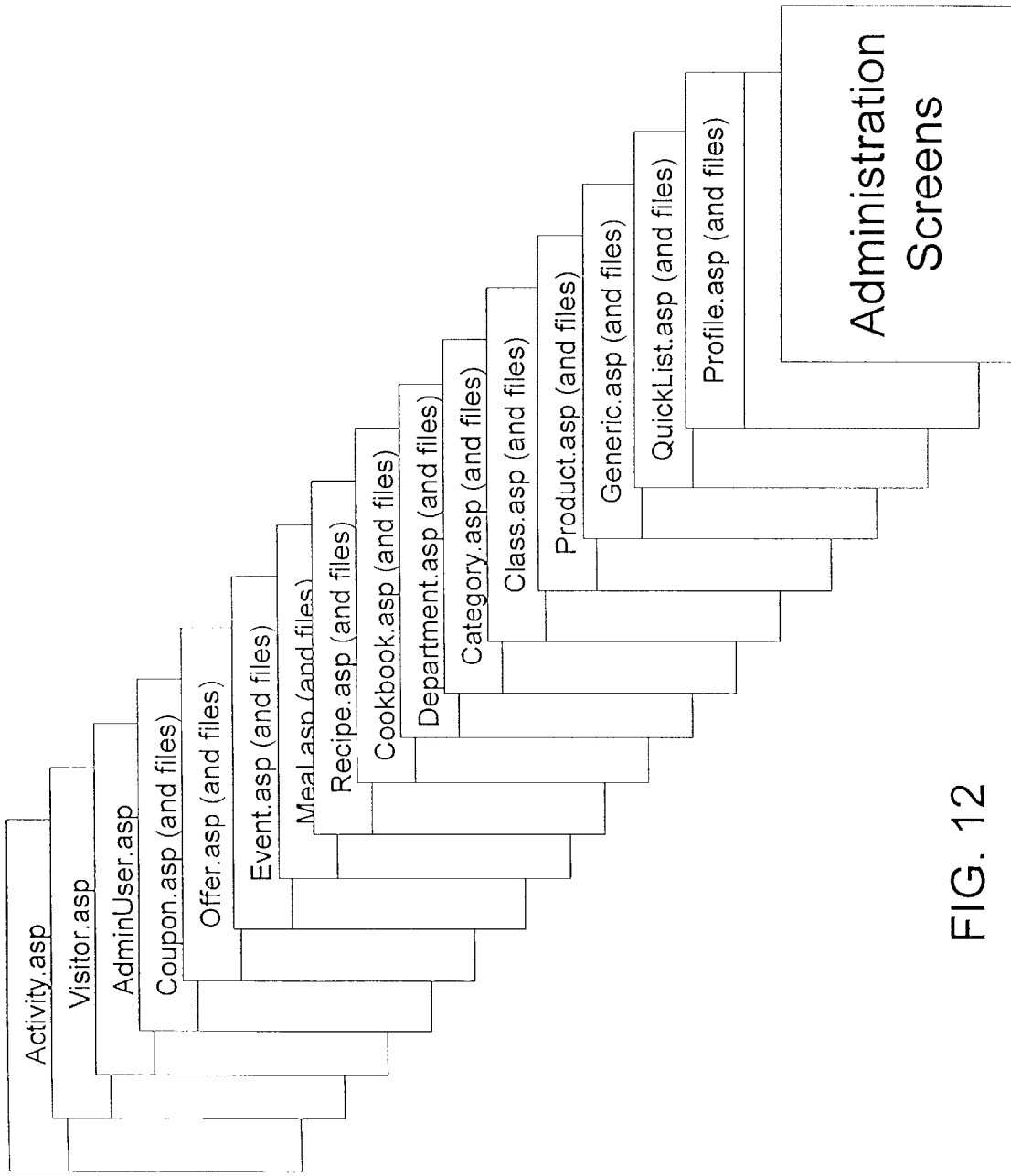
FIG. 12 shows the organization of administration screens.

Referring now to FIG. 12, the server 14 may include a number of administration screens which may also be implemented as ASP files in a password-protected directory on the server, for example, in the server database 16. These screens will allow the household management system to view or administer data for which they are responsible, including data updates of the content, recipes (with images and thumbnails), Quick List seed items, ingredients, products, generic products, product classes, categories, departments, offer types, meals and types (e.g. "family meals", "Mexican meals", etc.), contact categories, event categories, suggested events, To-do list types (e.g. "Spring cleaning"). Where appropriate, screens could be located where Business Partners could have access to their own information, such as promotions and special offers.

The data administration screens may also include software to manage additions, deletions and tracking of the user database to complete trend reports on the use of the server (frequency, modules used) which may be organized by user attributes (age, number of children, geographic). The software may also manage user accounts to provide the basis for personalizing the user's experience, analysis of usage data and tracking customer communications (customer service, mailings, e-mails, etc.). In addition, surveys may be conducted on behalf of participating companies and for internal purposes (to better understand satisfaction use of the system and how to more effectively market the system) and displayed. The Application may also include activity tracking of the user (click stream).

The Administration Screens May Include the Following Screens (see FIG. 12)

Activity.asp—Displays # registered users, any other useful diagnostic data

Visitor.asp—Displays # registered users, any other data for auditors, investors (in a separate folder)

AdminUser.asp—Allows search of users, displaying user names, passwords, emails, link to home page for each for technical support Coupon.asp (and files)—Allows coupon administration Offer.asp (and files)—Allows offer administration Event.asp (and files)—Allows event administration Meal.asp (and files)—Allows meal administration Recipe.asp (and Files)—Allows recipe administration CookBook.asp (and files)—Allows cookbook administration Department.asp (and files)—Allows department administration Category.asp (and files)—Allows grocery category administration Class.asp (and files)—Allows class administration Product.asp (and files)—Allows product administration Generic.asp (and files)—Allows generic product administration QuickList.asp (and files)—Allows quick list seed information administration Profile.asp (and files)—Displays profile information, specific information to be provided by the household management system.

The database 16 may include the following database tables:

Users—Holds registered user information, including name, address, email, username/password for logging in to the system.

Contacts—Holds information for a user on contacts for various categories including services such as lawn care or pest control, emergency numbers etc. Includes phone (including phone, cell, pager, fax), and email information.

Contact_categories—Holds categories for contacts. Since categories can be hierarchical, a parent category is also included.

Home_maintenance—Holds information for a user on home maintenance activity, including type, description, date, next service and contact.

Pets—Stores a user's pet information.

Pet_vet_visits—Records activity for pet visits (including immunizations), data includes vet name, date, procedure, and cost.

Gift recipients—Stores information on people for whom a user may wish to purchase gifts. Includes name, address, birthday, anniversary, clothing size, likes and dislikes.

Gift_ideas—Stores potential gifts for recipient.

Events—Stores events in a user's calendar.

Event_categories—Stores categories for these events, includes personal, work, medical etc.

Recurring_event_schedule—Store instructions on how an event may repeat, including whether daily, weekly, monthly or yearly, days of the week on which it is held, as well as a week or month cycle (e.g. $4^{th}$ Thursday in November).

Recipes—Stores recipe information, both preloaded and custom. Includes name, images, directions, serving size, preparation time, region, cookbook, course and food group.

Regions—Stores possible regions for a recipe.

Cookbooks—Stores possible cookbooks for a recipe.

Recipe_keywords—Stores search words for a recipe.

Nutrition—Stores nutrition information for a recipe

Ingredients—Stores ingredients (both generic and specific products) used in a recipe.

Products—Stores name brand products, includes UPC, brand, class, description and size.

Generic_products—Stores generic products in each category.

Product_classes—Stores categories for each product class.

Product_categories—Stores categories for each product class.

Product_departments—Stores departments for each product category.

Coupons—Stores current coupon information, includes product class, offer period, offer amount, and brand.

Offer_types—Stores offer types of coupons.

Shopping_lists—Stores a user's shopping lists, and be named includes shopping date.

Shopping_list_items—Stores products (both specific and generic) in a shopping list.

Quick_list_items—Stores products (both specific and generic) in a user's quick list.

Meals—Stores a user's meals, includes names.

Meal_items—Stores recipes and ingredients incorporated into a meal.

Meal_schedules—Stores a subset of recurring event schedules to be used for meal patterns.

Suggested_events—Stores sample events to help with family activity planning.

Family_members—Stores family members grouped under a user.

Meal_types—Stores categories to make finding meals easier, such as region, "large", "quick", etc.

Todo_lists—Stores to—to lists.

Todo_list_items—Stores items on to-do lists.

Todo_list_types—Stores types to-do lists, such as "spring cleaning".

Shopping_list_item_recipes—Where shopping list items come from.

Free_form_items—User-input shopping list items which aren't in a Family Time product class.

Todo_list_types—Stores types of to-do lists, such as "spring cleaning".

Holidays—Stores holiday list.

Holiday_types—Stores types of holidays, such as "US", "Canadian", "Christian", "Jewish", etc.

Figure 13:
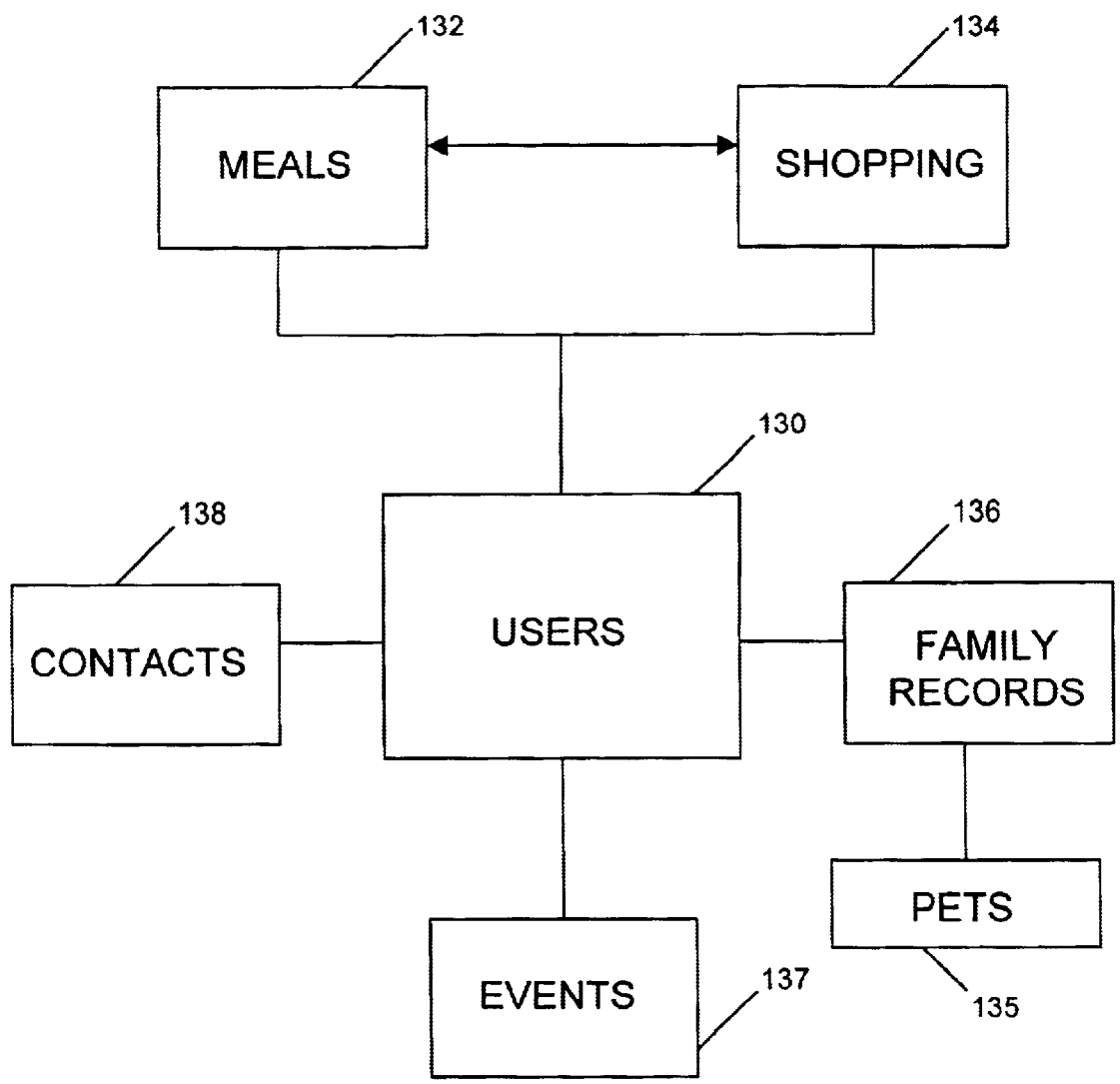
FIGS. 13–19 show block diagrams of the various functional modules of the system according to the invention.
Figure 14:
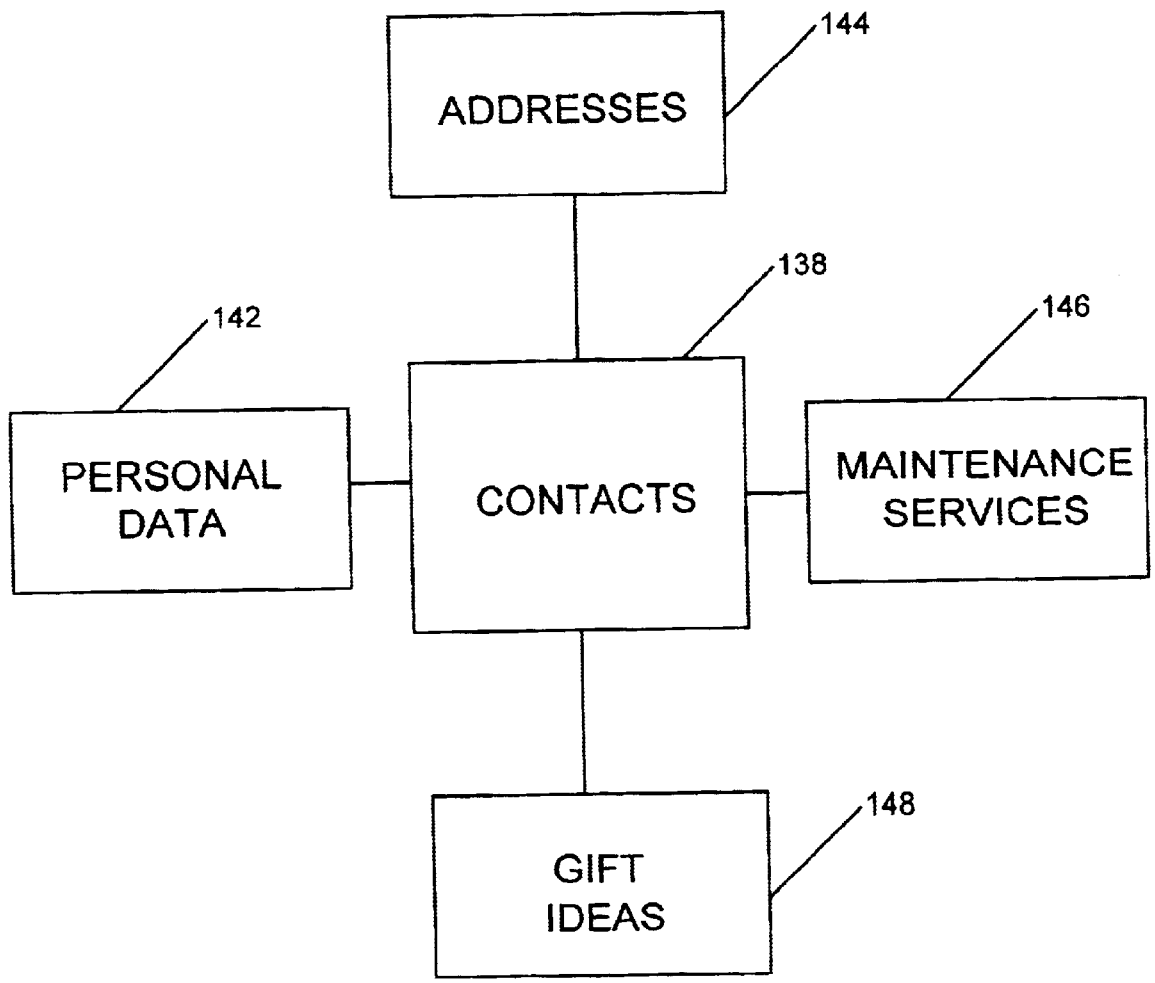
Figure 15:
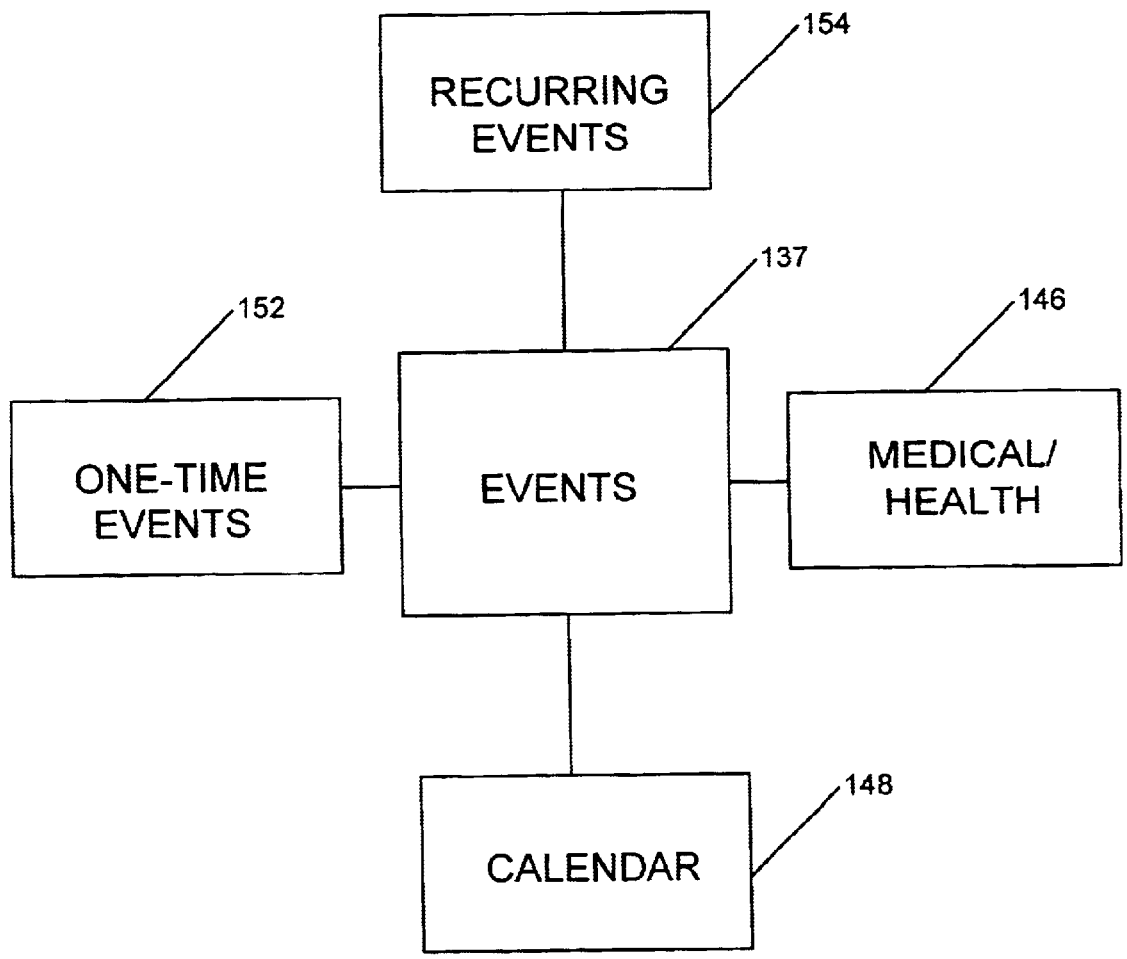

Referring now to FIGS. 13–20 and as described above, the invention provides a home management system and a method for using such system which organizes and manages in an integrated fashion the household activities. As seen in FIG. 13, the user 13 can review and manage in an integrated fashion various household activities, such as planning meals 132 and shopping for staples and other items 134, keeping family records 136 and pet history 135, schedule and be reminded of upcoming events 137 and organize his/her contacts 138. All these activities are integrated and interrelated, as shown with particularity in FIG. 20, which shows in detail the functional blocks of FIG. 13.

Figure 20:
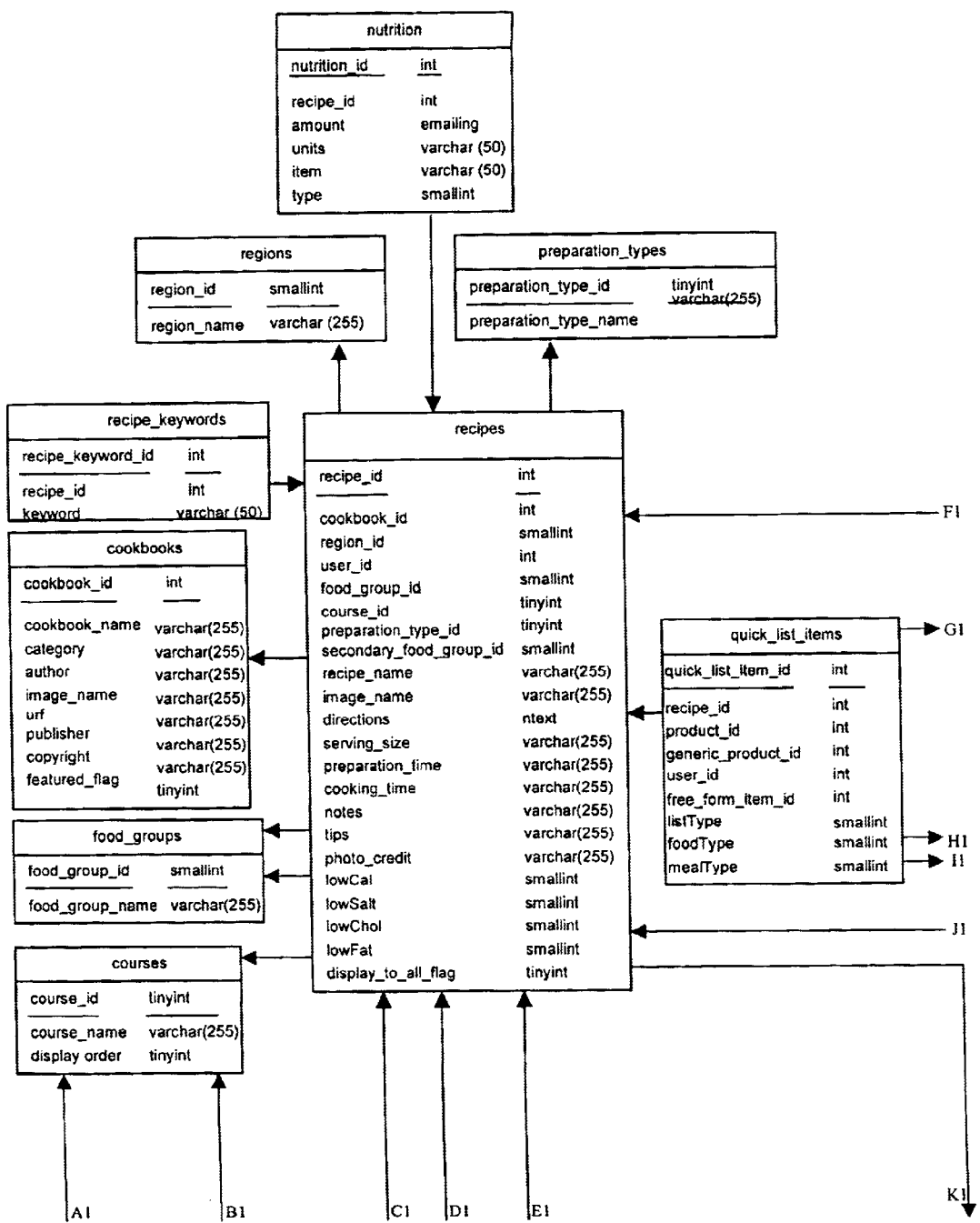
FIG. 20 is a detailed diagram of the interrelationship of the modules of FIGS. 13–19.
Figure 20:
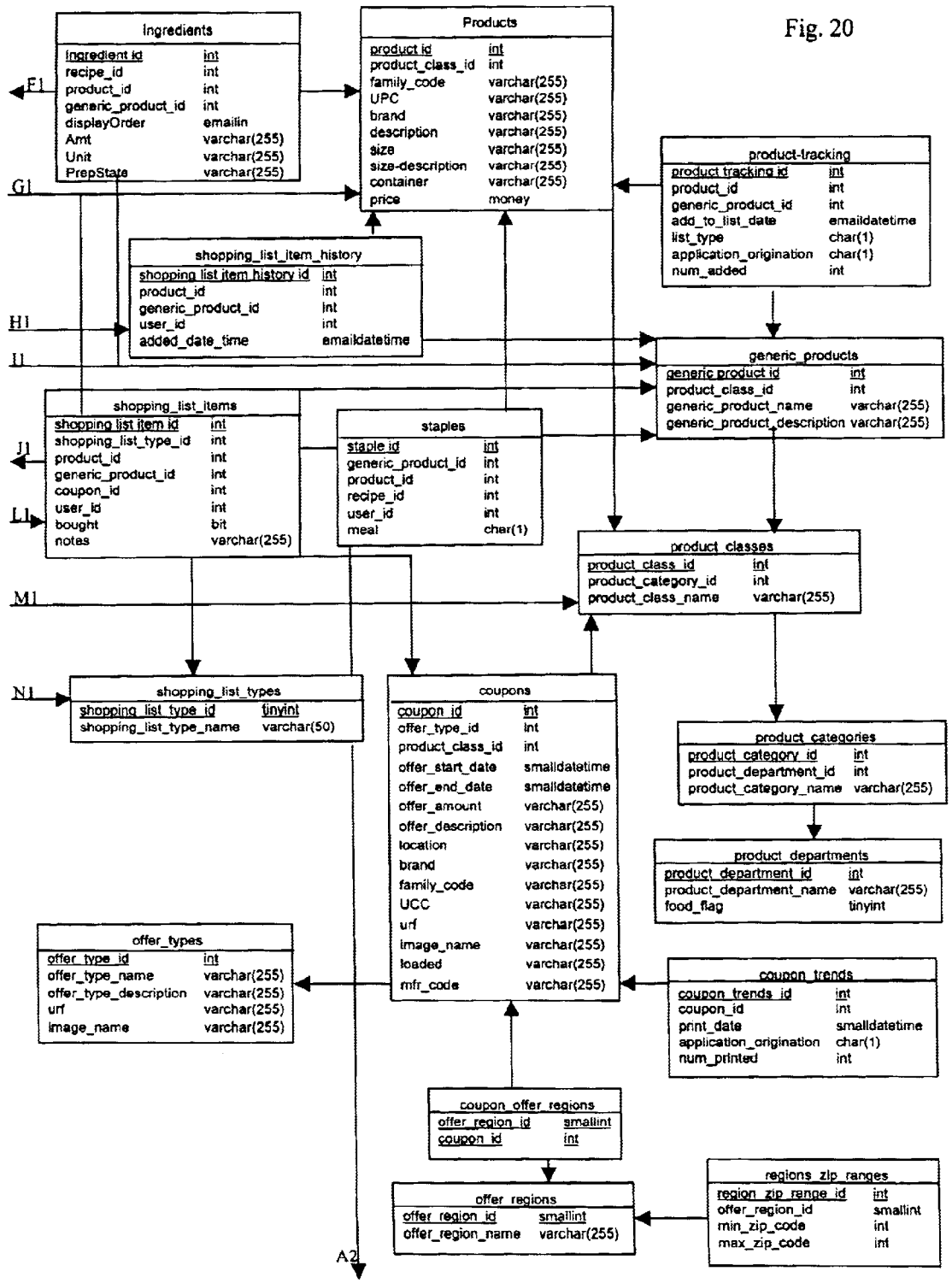
Figure 20:
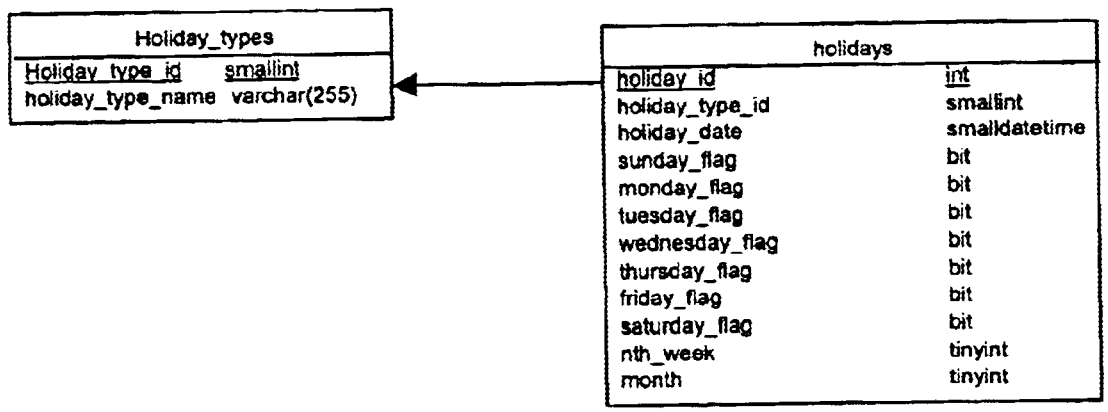
Figure 20:
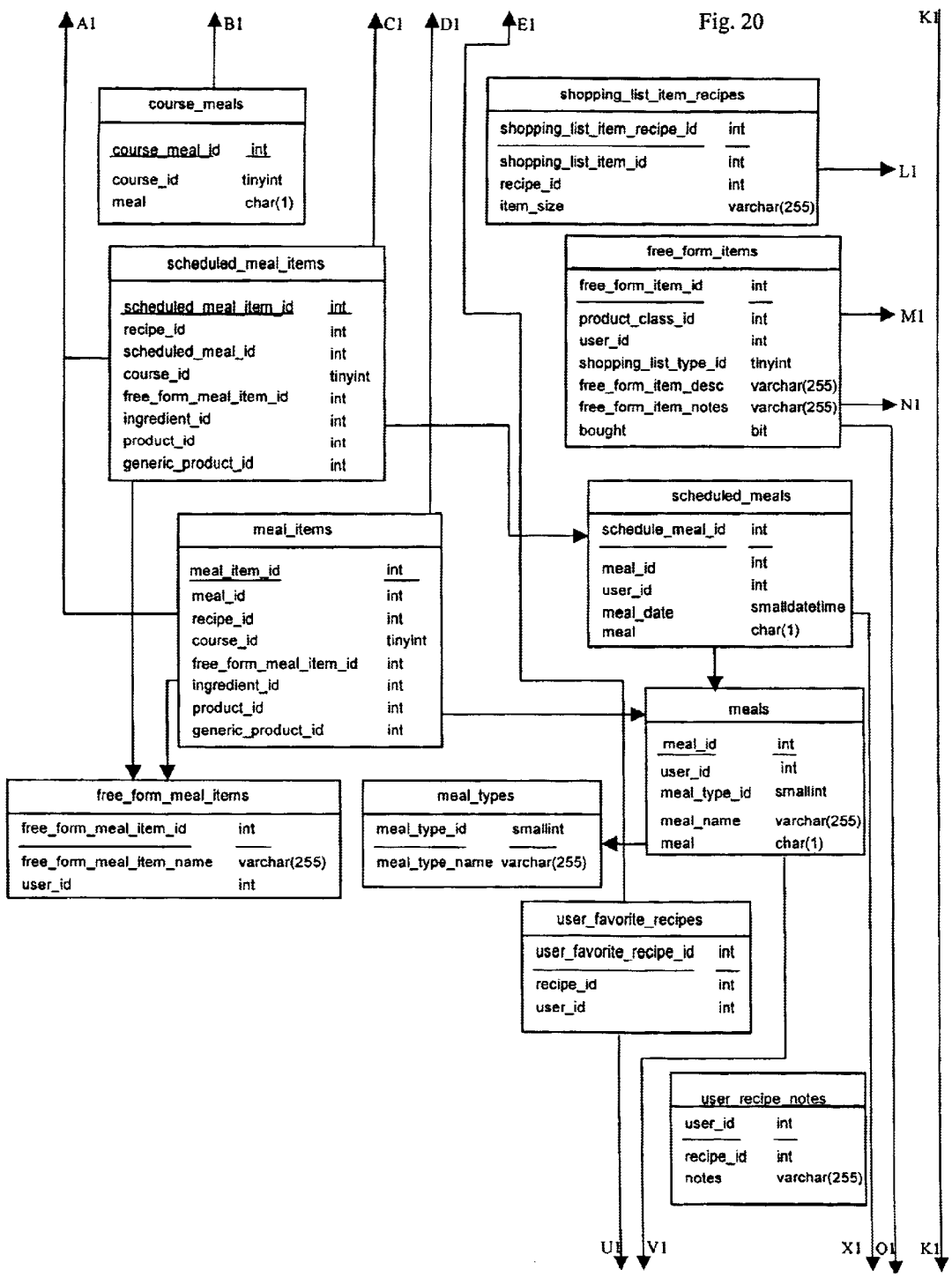
Figure 20:
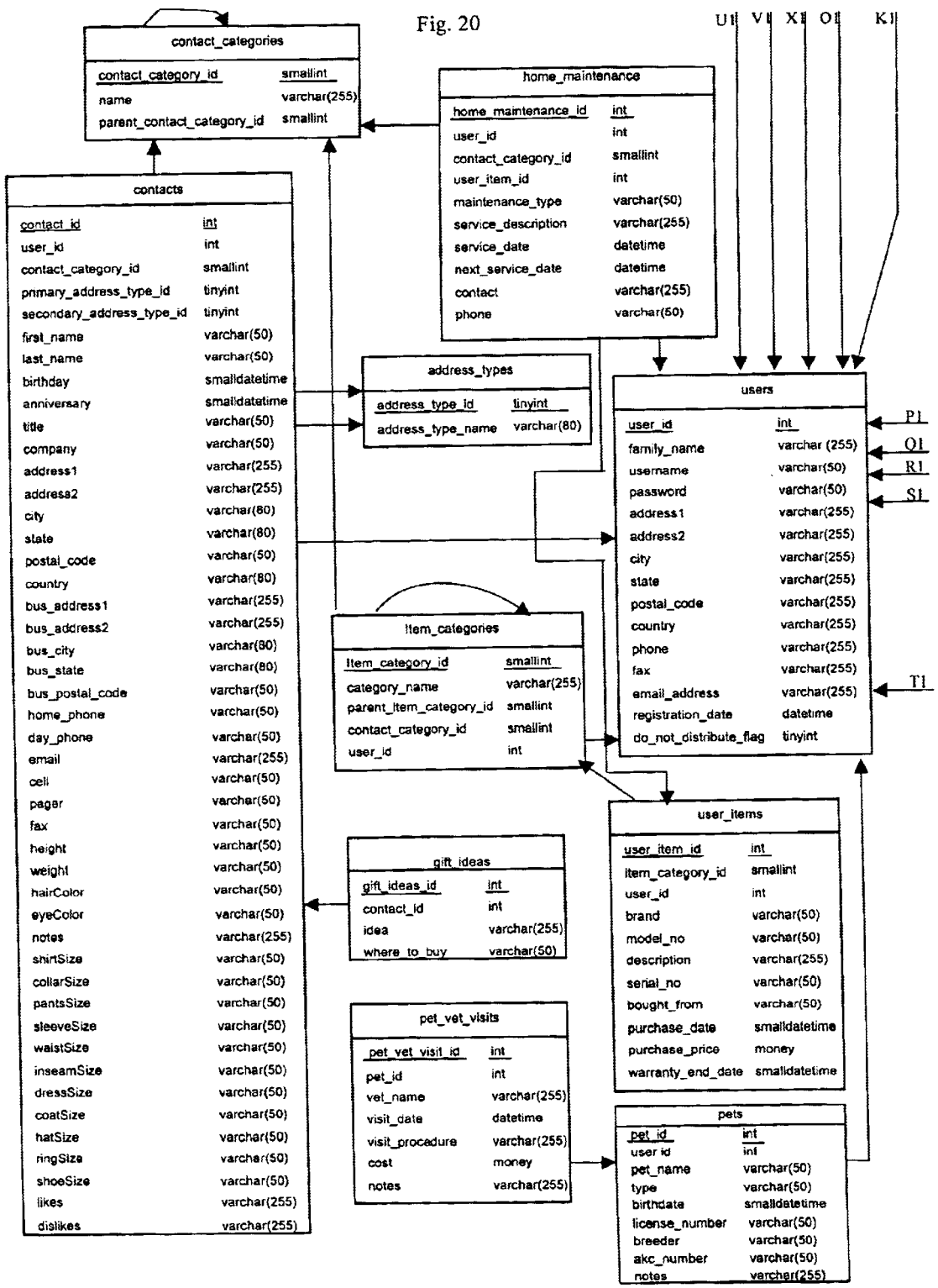
Figure 20:
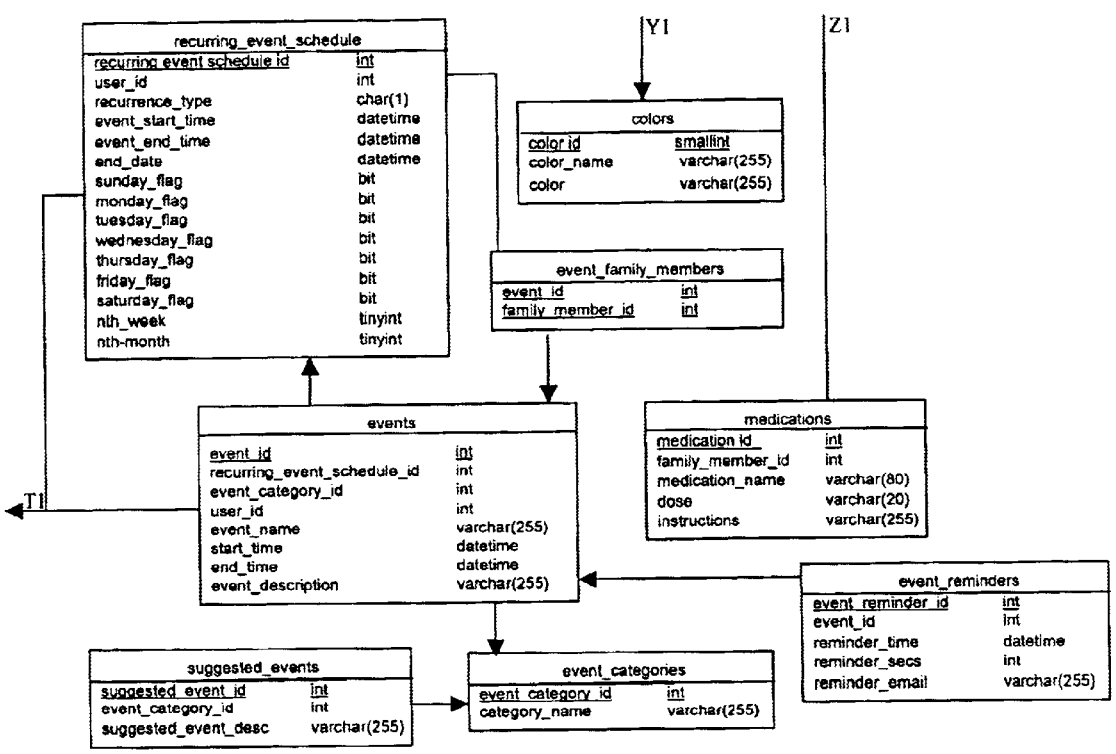
Figure 20:
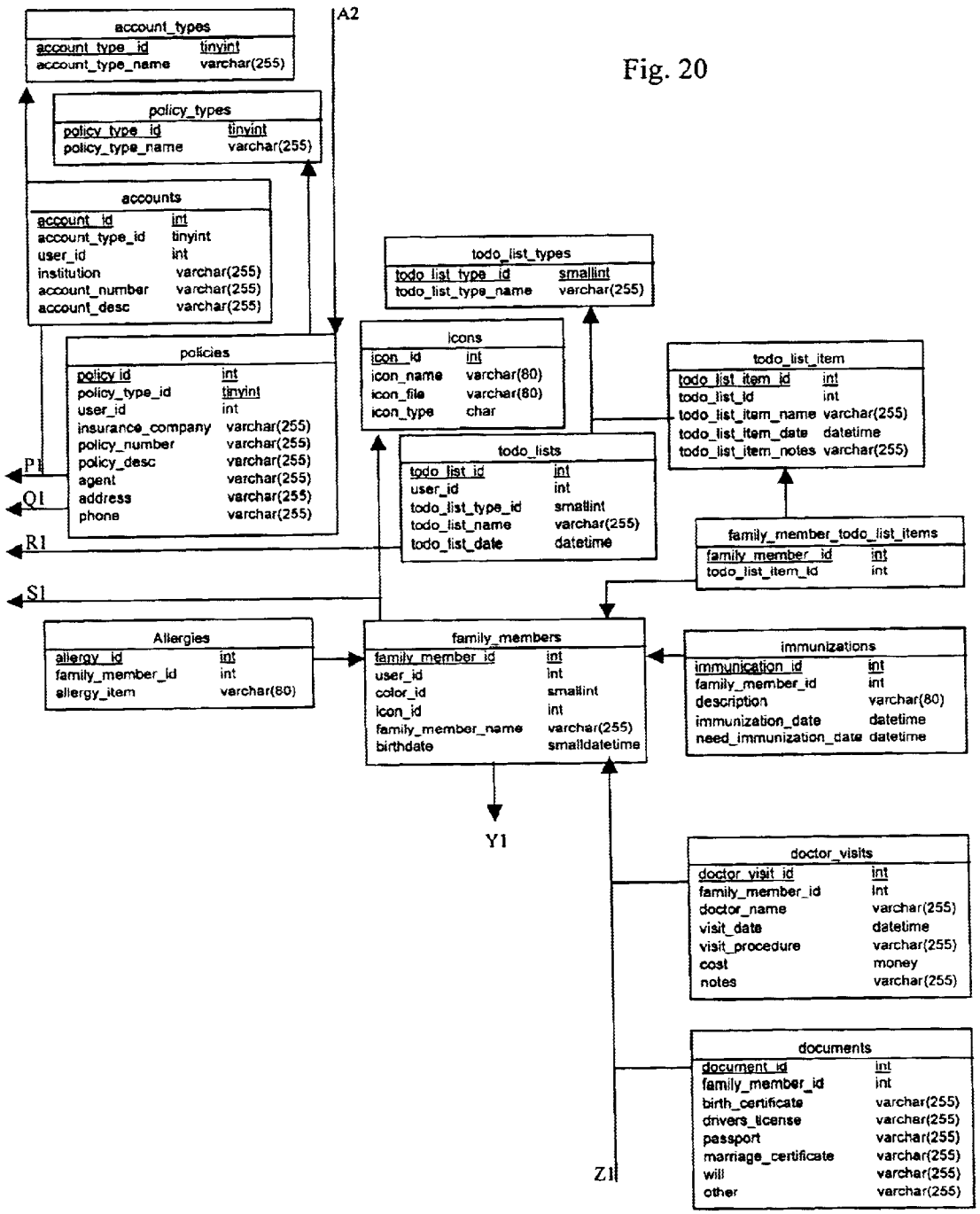

The different sections indicated in FIG. 20 reference each of the respective FIGS. 14–19 to which they correspond. For example, the contact information 138 of FIG. 14 may include personal data 142 of the contacts, such as names, phone numbers, addresses 144, gift ideas 148 for special occasions, as well as the names, addresses, etc., of professionals, such as home maintenance services 146. Events 137 depicted in FIG. 15 may include one-time events 132 and recurring events 154 as well as medical/health information 146 regarding doctor visits and drugs, and a calendar 148. It will be understood that the calendar 148 may be interfacing with many of the other activities, such as scheduling of meals, as indicated by the arrows in FIG. 20.

Figure 16:
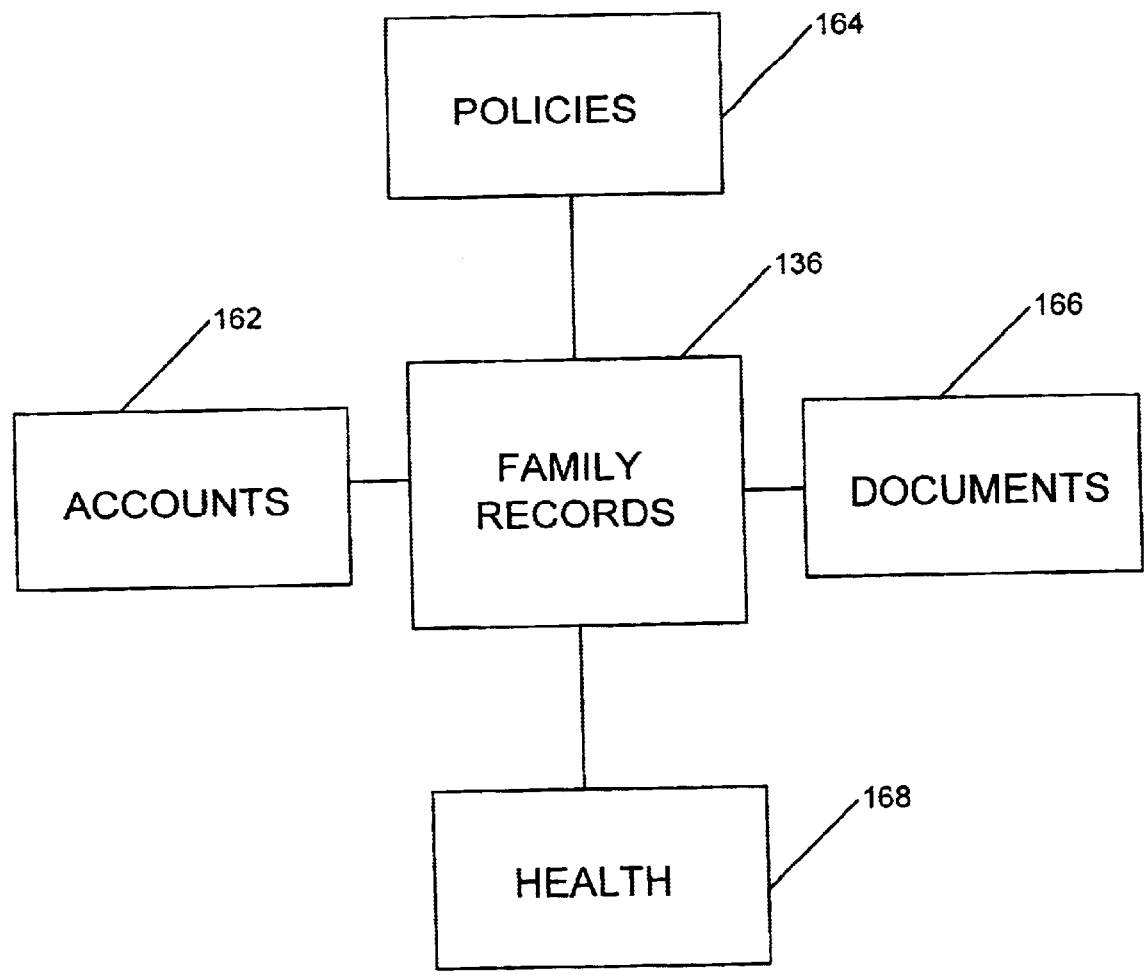
Figure 17:
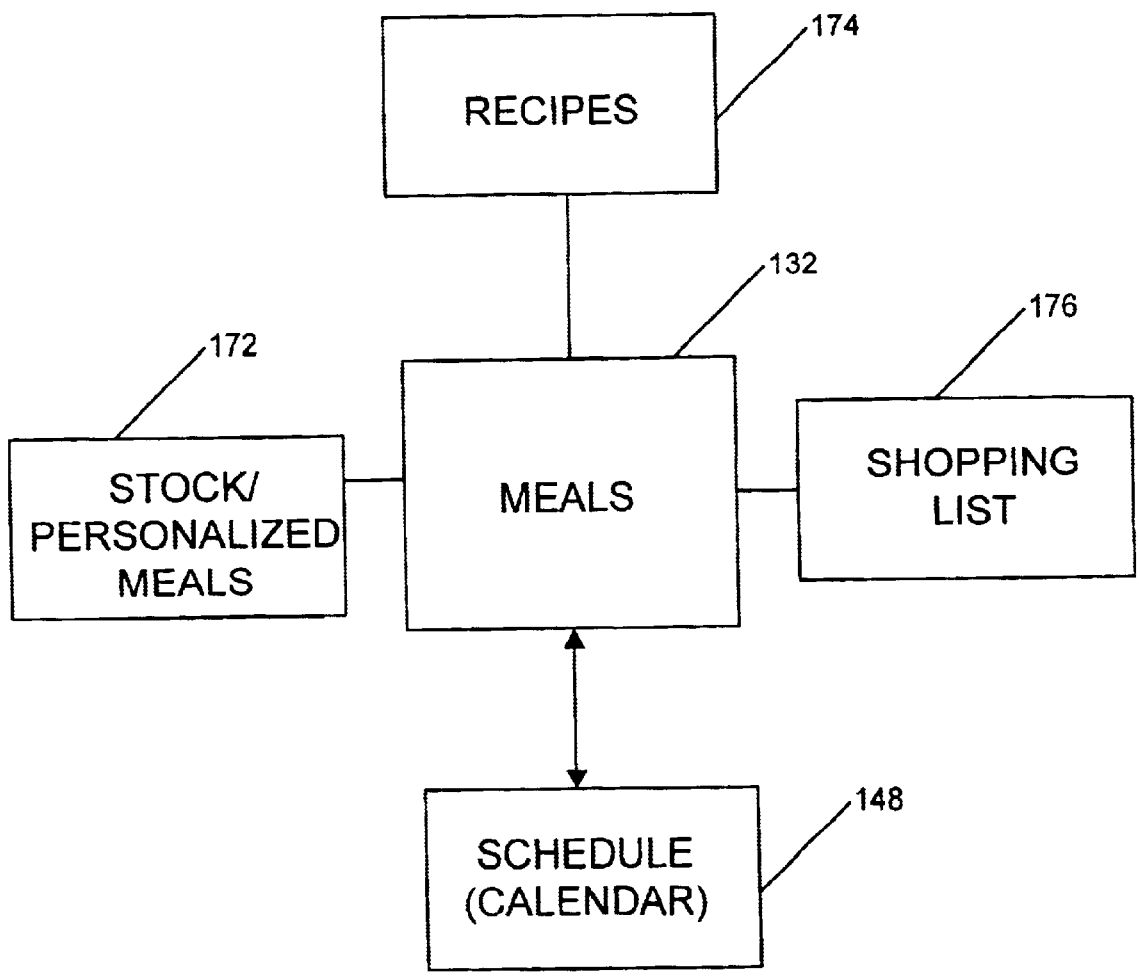

Another activity managed with the integrated household management system are the family records 136 shown in FIG. 16 which may include financial information 162, such as bank accounts, mortgage lenders, etc., (insurance) policies 164, important vital records and documents 166, such as birth and marriage certificates, and health records 168.

An important feature of the integrated household management system is the meal planner 132 which is linked to a collection of recipes 174 geared towards stock meals 172 provided by the service system or personalized meals 172 entered and/or modified by the user. The meals 132 can be scheduled, as mentioned above, with the help of the calendar 148. The meals 132 can also be linked to a shopping list 176 based on the recipes 174 which are used to prepare the meals 132. As will be apparent from FIGS. 18 and 19, the shopping list 176 can be linked with promotions, store information and the like. The shopping list can match both ingredients, like those used in recipes, as well as branded items, like Gerber and Ivory. Since there may be different products, such Ivory Dishwashing Liquid or Ivory Laundry Flakes, intelligence should be built into the system to quickly provide context. Also, ingredients should be anticipated so that the ingredients can be quickly "matched" and "attached" to products in the shopping list.

Figure 18:
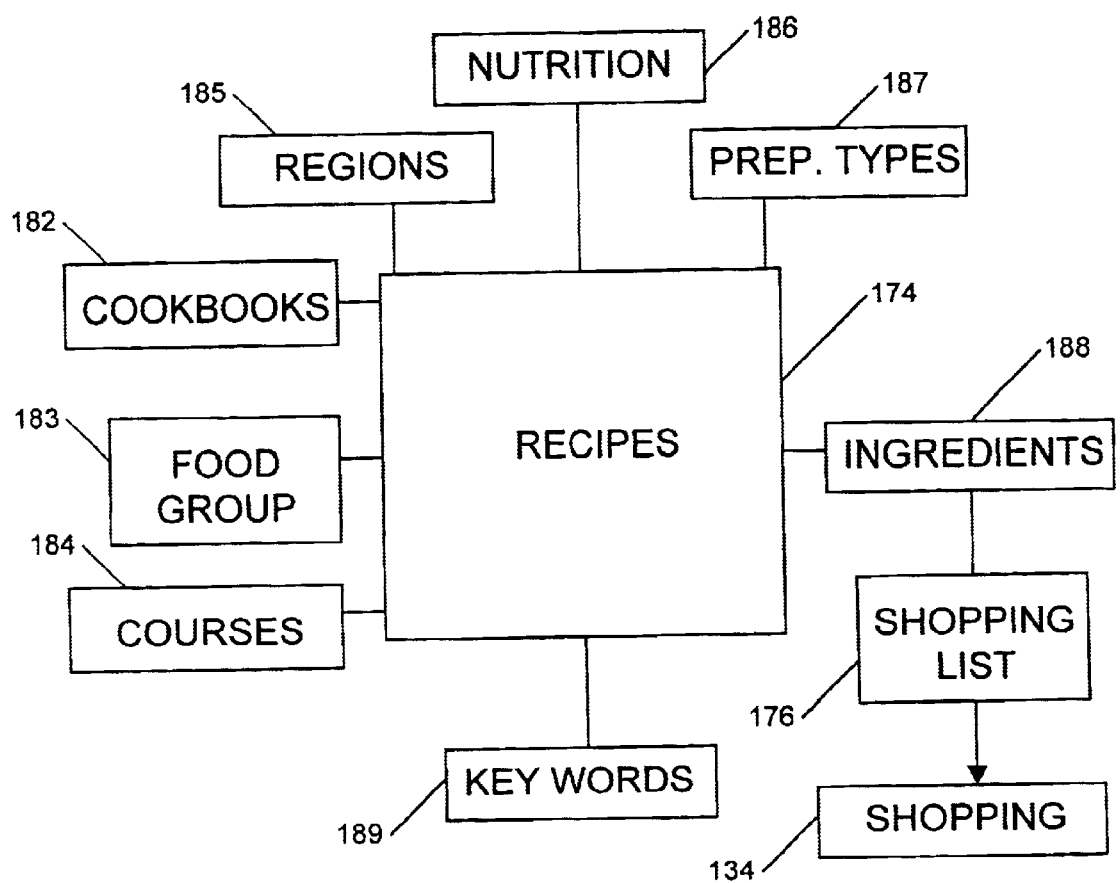
Figure 19:
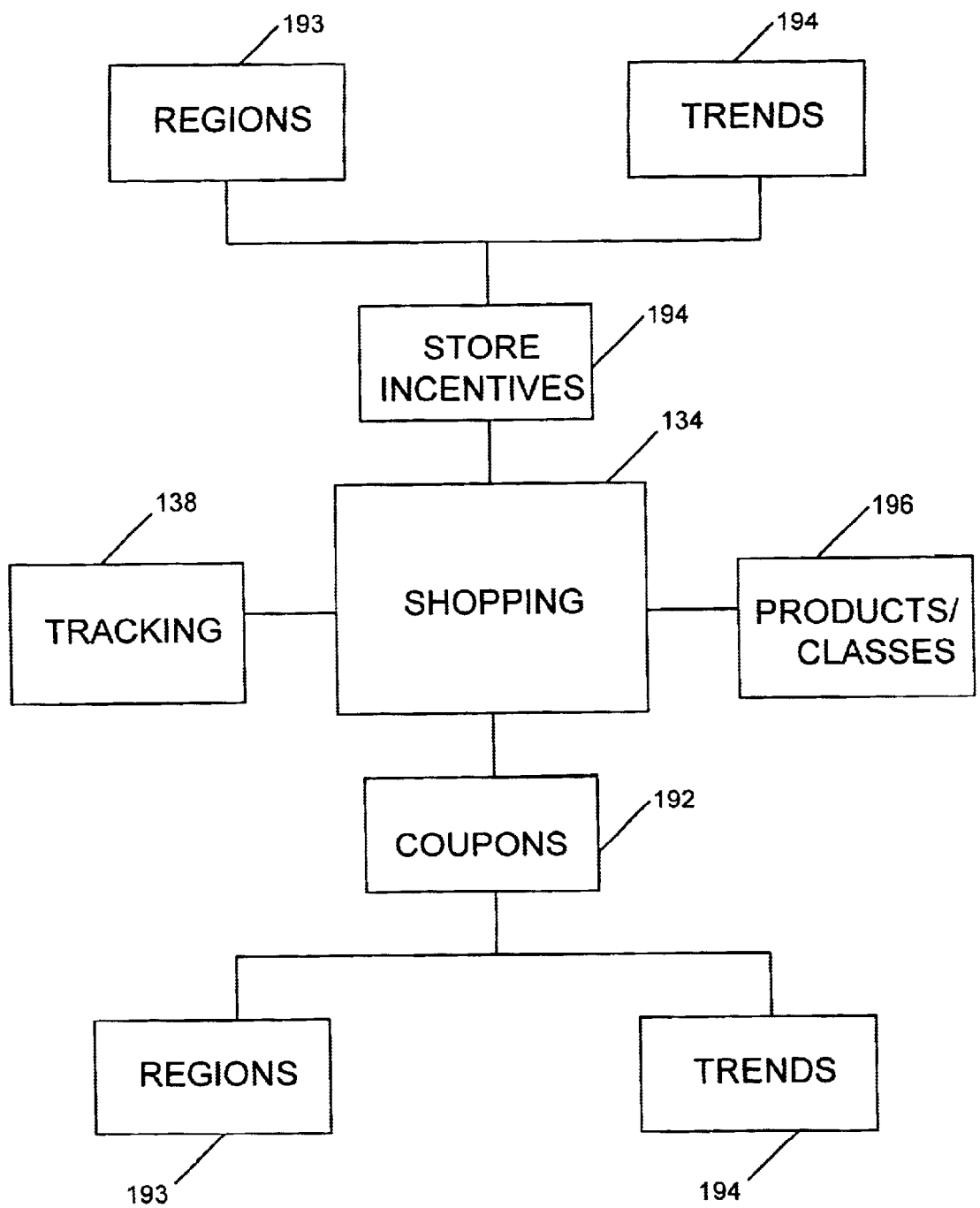

Referring now to FIG. 18, recipes 174 can be organized according to different criteria and features, such as by countries and regions 185, by nutrition 186 and/or modes of preparation 187. Various cookbooks 182 may be consulted when preparing a meal, listing courses 184 and food groups 183 for a balanced diet. The recipes may be searched using key words 189. Based on the selected recipes, the system can prepare a list of ingredients 188, while keeping track of inventory based on the quantities purchased and consumed according to the meal planner. The list of ingredients 188 may be consolidated in form of a shopping list 176 for the actual shopping activity 134. The shopping list 176 may be organized according to brand names and/or aisles in a supermarket.

The shopping activity 134 can involve promotional activities, such as the issue of coupons 192 which can be printed by the user on a PC before commencing the shopping activity. Coupons may be awarded by a retailer to the service system and may be limited in number and/or marked with distinguishing indicia, such as unique serial numbers or other codes. The coupons 192 may be different for different regions or locations 193 or purchasing trends 194 of the user monitored by the service system or supplied directly by the user, for example, in response to a questionnaire. Likewise, a store may offer store incentives 194 which may be awarded, for example, at the time of check-out as an electronic credit. These incentives 194 may also reflect various regions/locations 193' and purchasing trends 194', similar to the coupon offers 192 described above. The shopping behavior of the user may be tracked 138 by the service system to obtain user demographic data for subsequent user targeting. Manufacturers and retailers may request information such user demographic data which can be provided organized by product classes and products 196.

The system and method described above may be integrated with systems operated by companies, retailers and clearing houses to communicate to the user promotional offers suggesting purchases, activities, services and meal schedules. Such offers can be made in the form of announcements (email, banners, windows), with explicit coupon offers that can be redeemed in a store, or by directly crediting a promotional award to a purchase made in the store.

Accordingly, it will be understood that the invention is not to be limited to the embodiments disclosed herein, but is to be understood from the following claims, which are to be interpreted as broadly as allowed under the law.

We claim:

1. A method for managing household activities of a user connected to a service system, comprising:

the user providing to the service system user data which include demographic user information and interactive user behavior characteristics;

the service system in response to the user data providing the user with a household management tool, the user scheduling the household activities by using the household management tool, wherein information about the scheduled household activities is transmitted from the user to the service system, the service system associating a scheduled household activity with an incentive and transmitting the incentive to the user.

2. The method according to claim 1, wherein the incentive is provided to the service system by a provider selected from the group consisting of retailers, manufacturers, service providers and clearing houses.

3. The method according to claim 2, wherein the provider is connected to the service system via the Internet.

4. The method according to claim 1, wherein the household management tool is a scheduler or calendar.

5. The method according to claim 1, wherein the user is connected to the service system via the Internet.

6. The method according to claim 1, wherein the scheduled household activity is a meal or meal schedule.

7. The method according to claim 6, wherein the household management tool includes a recipe.

8. The method according to claim 1, wherein the user comprises more than one user belonging to a common household and sharing the household management tool.

* * * * *